United States Patent
Mathur et al.

(10) Patent No.: US 12,190,453 B2
(45) Date of Patent: *Jan. 7, 2025

(54) OVERLAY PLACEMENT FOR VIRTUAL REALITY AND AUGMENTED REALITY

(71) Applicant: Comcast Cable Communications, LLC, Philadelphia, PA (US)

(72) Inventors: Arpit Mathur, Philadelphia, PA (US); Michael Chen, Wallingford, PA (US); Mark Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,167

(22) Filed: Oct. 11, 2023

(65) Prior Publication Data

US 2024/0127546 A1    Apr. 18, 2024

Related U.S. Application Data

(63) Continuation of application No. 15/910,562, filed on Mar. 2, 2018, now Pat. No. 11,823,332.

(51) Int. Cl.
| | |
|---|---|
| *G06T 19/00* | (2011.01) |
| *G02B 27/01* | (2006.01) |
| *G06T 15/20* | (2011.01) |
| *G06T 19/20* | (2011.01) |

(52) U.S. Cl.
CPC .......... *G06T 19/003* (2013.01); *G02B 27/017* (2013.01); *G06T 15/20* (2013.01); *G06T 19/20* (2013.01)

(58) Field of Classification Search
None
See application file for complete search history.

(56) References Cited

U.S. PATENT DOCUMENTS

| | | |
|---|---|---|
| 5,963,948 A | 10/1999 | Shilcrat |
| 9,306,880 B1 | 4/2016 | Hyndman et al. |
| 2005/0171746 A1 | 8/2005 | Thalhammer-Reyero |
| 2007/0220435 A1 | 9/2007 | Sriprakash et al. |
| 2010/0060648 A1 | 3/2010 | Carter et al. |
| 2010/0077311 A1 | 3/2010 | Santoro et al. |
| 2011/0310088 A1 | 12/2011 | Adabala et al. |
| 2011/0314049 A1 | 12/2011 | Poirier et al. |
| 2012/0330284 A1 | 12/2012 | Hyde et al. |

*Primary Examiner* — Jason A Pringle-Parker
(74) *Attorney, Agent, or Firm* — BakerHostetler

(57) ABSTRACT

Systems and methods are described to enable the creation and use of one or more interest meshes that may comprise interest values associated with points of interest in a virtual environment. A mesh may adapt to different environments and may be automatically created based on predefined criteria used to assign interest values to digital assets or points (e.g., coordinates) in the virtual environment. The virtual environment may use a mesh to guide a user toward points of interest by determining desired positions and viewpoint orientations for the user and guiding the user from point to point. Further, events may be triggered in the virtual environment that may change one or more meshes and/or create a new point of interest for a user. The user may then be guided using the changed mesh(es) to points of interest, including new points of interest.

27 Claims, 17 Drawing Sheets

OVERLAY PLACEMENT FOR VIRTUAL REALITY AND AUGMENTED REALITY

CROSS REFERENCE TO RELATED APPLICATIONS

This application is a continuation of U.S. patent application Ser. No. 15/910,562, entitled "Overlay Placement For Virtual Reality And Augmented Reality," filed Mar. 2, 2018, now U.S. Pat. No. 11,823,332, which is incorporated by reference herein in its entirety.

BACKGROUND

Virtual reality (VR) and augmented reality (AR) enable an immersive form of human-computer interaction where a user may experience a virtual environment and/or one or more virtual objects may interact with the surroundings of the user in the physical world. Both VR and AR allow a user to experience more avenues of entertainment than a traditional viewing screen, and content providers may develop media that takes advantage of the experiences VR and AR provide. Users may freely explore the created environments and view and/or interact with objects in these environments. Developers may attempt to guide users through an environment by creating barriers or explicit directions so that a user does not get lost or off-track.

Existing virtual reality and augmented reality environments allow a user the freedom to explore a virtual environment or enhanced physical environment. Freedom of exploration may allow the user to miss items of interest a developer inserted into the environment. For example, a user playing a video game in virtual reality may walk by or not see important collectibles to progress a narrative. In another example, an advertisement such as a virtual product placement or virtual billboard may be sidestepped by a wandering user. Further, in an AR setting, a digital asset of interest may be overlaid or placed in a location not suitable for viewing. For example, a virtual TV show may be overlaid on a bright wall, washing out the color for the user and making the show difficult or impossible to watch. A user missing an item of interest or not able to view content may have a poor experience, and advertisers may be unhappy if advertised or placed products are not seen by users. In addition, if a user is forced to follow a specific path or hits a barrier in the virtual environment, immersion may be broken, resulting in a poor user experience.

SUMMARY

Systems and methods are described to enable the creation and use of one or more interest meshes that may comprise interest values associated with points of interest in a virtual environment. A mesh may comprise a plurality of values corresponding to coordinates of locations in the virtual environment. Values of the mesh may be stored or maintained in any suitable data structure and may reside in memory accessible during use of the virtual environment. For example, values of the mesh may be stored in or form a matrix in memory, and each value of the mesh may correspond to a respective coordinate of the virtual environment and may represent a value of interest associated with the corresponding coordinate. A mesh may adapt to different environments and may be automatically created based on predefined criteria used to assign interest values to digital assets or points (e.g., coordinates) in the virtual environment. Further, a user's surroundings may be scanned, either in a virtual environment or in a physical environment, for predefined attributes indicating suitability for displaying an overlay and/or digital assets. Interest values may be assigned based on this scan, and an interest mesh may be generated. The overlay and/or digital asset(s) may then be displayed based on the mesh. The virtual environment may use a mesh to guide a user toward points of interest by determining desired positions and viewpoint orientations for the user and guiding the user from point to point. Guiding may comprise haptic, visual, and/or audio cues and may also comprise moving the virtual environment around the user. Further, events may be triggered in the virtual environment that may change one or more meshes and/or create a new point of interest for a user. The user may then be guided using the changed mesh(es) to points of interest, including new points of interest.

This Summary is provided to introduce some of the concepts of the disclosure in a simplified form. These and other concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

Figure 1:
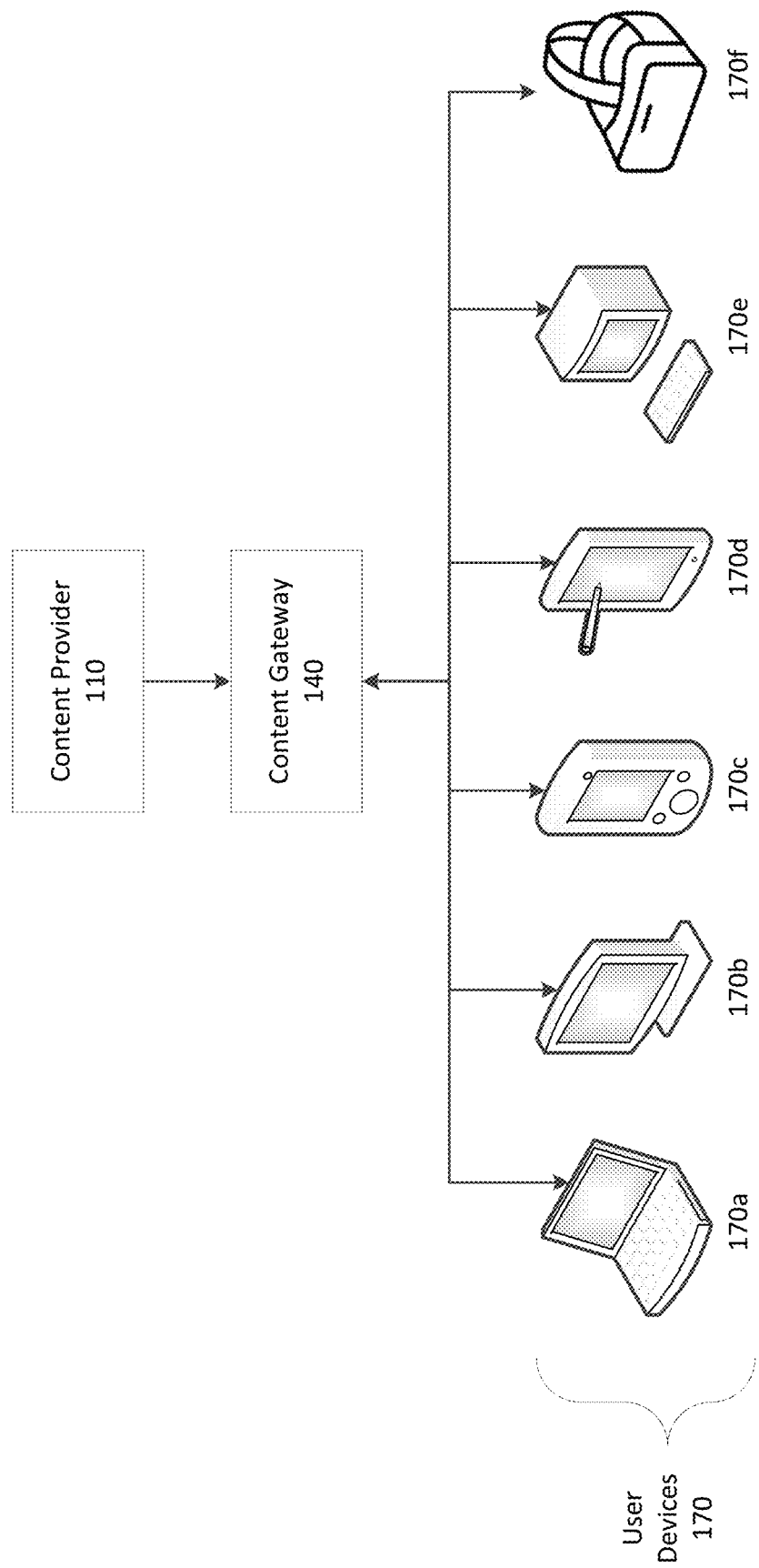
FIG. 1 shows an example system of entities involved in the creation and display of a virtual environment.

Electronic content is consumed on a daily basis. Articles, blogs, and documents are read; television shows and movies are watched; books are both read and heard; video games are played; software is executed. Much of consumed content is consumed via smartphones, laptops, desktops, tablets, game consoles, and other computer systems, typically involving use of the Internet or other computer network.

For a user to interact with content on a computer system, the content should have an associated user interface. A user interface may allow a user to interact with the content in some way, typically by inputting a command. For example, a user interface for a video streaming service may allow a user to search and navigate a library of videos and then select a video of his or her choosing to watch. Then, during playback, the user may or may not be able to perform various actions such as pause, play, rewind, and fast-forward. Generally, a user interface on a computer system may use any viable method of input compatible with the system, such as pushing buttons on a remote control or game controller, voice commands, touch gestures, body gestures, keyboard or mouse commands, or any other method of human-computer interaction that allows a user to access or manipulate data on the computer system.

Virtual reality (VR) leverages three-dimensional (3D) environments to immerse a user in a virtual environment. A 3D virtual computer environment may be created, and users may typically don specialized computer eyewear to immerse themselves in the environment. Once immersed in the environment, a user may look around as if she is physically inside it. For example, the user may typically look 360 degrees in every direction to view the environment. In some cases, the user may also walk around the environment by walking in physical reality, which may or may not take place on a treadmill or other contained apparatus a user may move in or on. Augmented reality (AR) is similar in concept to virtual reality in that it may involve virtual objects projected to a user's visual field; however, these virtual objects may be projected into the user's current real physical environment. For example, a user may hold up his mobile phone camera view and see a 3D virtual object added to the screen image, such as a rendering of a completed building at a construction site. In another example, a user may wear specialized computer eyewear that projects virtual objects into the observed physical environment, such as a news channel being broadcast on a wall as if a television was present, video game characters on a user's coffee table that the user may manipulate, or other virtual objects the user may see and interact with.

User interfaces for VR and AR may typically allow interactions via body gestures, voice commands, and button commands, which may be available via controllers, microphones, environmental sensors, or any other viable input apparatuses. For example, a user may physically move his head in a specific direction to view a virtual object or scroll through a list of virtual objects; a similar action may be performed by one or more joysticks or directional-pads on a controller or headset. To select such a virtual object, a user may speak "select" or another command that indicates to the computer system that the user would like to select the object, or the user may press a button on a remote control, the VR or AR headset, or other controller to select (e.g., "pick up") a desired object.

Content providers may wish to guide users through virtual environments in a specific manner and/or indicate points of interest to a user. For example, a content provider may wish for a user to experience a specific narrative in a virtual environment. Further, a content provider may wish for a user to see specific digital assets, such as collectibles or advertisements, while experiencing the virtual environment.

Systems and methods are described to enable the creation and use of one or more interest meshes that may comprise interest values associated with points of interest in a virtual environment. A mesh may comprise a plurality of values corresponding to coordinates of locations in the virtual environment. Values of the mesh may be stored or maintained in any suitable data structure and may reside in memory accessible during use of the virtual environment. For example, values of the mesh may be stored in or form a matrix in memory, and each value of the mesh may correspond to a respective coordinate of the virtual environment and may represent a value of interest in the corresponding coordinate. An example of a cell of such a mesh may be of the form (coordinate 1, coordinate 2, coordinate 3, value) in a 3D virtual environment. A mesh may adapt to different environments and may be automatically created based on predefined criteria used to assign interest values to digital assets or points (e.g., coordinates) in the virtual environment. Further, a user's surroundings may be scanned, either in a virtual environment or in a physical environment, for predefined attributes indicating suitability for displaying an overlay and/or digital assets. Interest values may be assigned based on this scan, and an interest mesh may be generated. The overlay and/or digital asset(s) may then be displayed based on the mesh. The virtual environment may use a mesh to guide a user toward points of interest by determining desired positions and viewpoint orientations for the user and guiding the user from point to point. Guiding may comprise haptic, visual, and/or audio cues and may also comprise moving the virtual environment around the user. Further, events may be triggered in the virtual environment that may change one or more meshes and/or create a new point of interest for a user. The user may be guided using the changed mesh(es) to points of interest, including new points of interest.

FIG. 1 shows an example of a system for enabling embodiments described herein. The example entities of FIG. 1 may be part of or use a computer network, which may be a small, home network or part of a large network such as the Internet, or a combination of both. Additionally, the entities of FIG. 1 may be part of a single computer system.

The content provider 110 may be used by a provider of consumable content, such as a media company or other source of content that may be experienced via a VR interface or an AR interface. For example, the content provider 110 may be used by a TV or movie studio, a video game company, a software developer, or even a single user. The content provider 110 may be communicatively connected to a content gateway 140, as shown in FIG. 1. The content provider 110 may transmit media content to the content gateway 140. Media content may be entities the user of the content provider 110 wishes to allow users to experience. For example, a media content item may be a video game, a movie, a TV show, or any other content a user may experience via a VR interface or an AR interface.

The content gateway 140 may be a user-facing provider of media services, such as software used by a cable company or streaming service, which may aggregate content from several sources, such as multiple content providers, into a single source point for a customer. The content gateway 140 may deliver content via a set top box, the Internet, a local hard drive, or any other viable method of delivering content to a user. As shown in FIG. 1, a user may access content via a laptop 170*a*, a television 170*b*, a smartphone 170*c*, a tablet 170*d*, a desktop 170*e*, a VR headset 170*f*, or any other device capable of presenting content to a user. The content gateway 140 may present VR or AR user interfaces to enable users to experience the content to which the content gateway 140 provides.

The content provider 110 and the content gateway 140 may be implemented on one or more computers that may operate independently or may be operated by an entity or user. For example, they may take the form of software components on one or more computers or modules within a single software suite. Communicative connections between the components may be physical connections, such as those via hardware circuits or LAN cables, wireless connections, such as those via WiFi or cellular, or any other suitable communicative connection. In an example, the content provider 110 is used by a media company that creates virtual environments, such as a virtual environment that corresponds to the atmosphere seen in a movie. The content provider 110 may send that virtual environment to a content gateway 140. In an example, the virtual environment may be sent via a file transfer protocol, and the communicative connection between the content provider 110 and the content gateway 140 may be an Internet connection. The content gateway 140 may receive or access the virtual environment and may store the virtual environment for display to users accessing the content gateway 140 and attempting to experience the atmosphere of the movie.

In another example, the content provider 110 and the content gateway 140 may be software programs or software modules on a single computer. A user of this computer may create content with or open content with the content provider 110. Such content may be a home movie, a video game, or other content that may be experienced via a VR interface or an AR interface. The user may use the content provider 110 to create digital assets for use in the interface, the interface itself, or both. In this example, communicative connections may be one or more hardware circuits on the computer, such as a bus. The user may then experience the content from the computer or other device capable of accessing the content.

Media content may be 2D or 3D and may have the ability to adapt dimensions dynamically to a user device accessing the interface. For example, an environment may be created for use in a 3D VR setting, but may be viewed as a 2D environment from a smartphone, TV, or computer. Any digital assets a content gateway receives and/or accesses may be interactive and may allow the user to select or manipulate them in an associated VR or AR environment or setting. For example, a user may select an image to begin playback of a movie on a wall or select a 3D model to view and/or manipulate.

Figure 2:
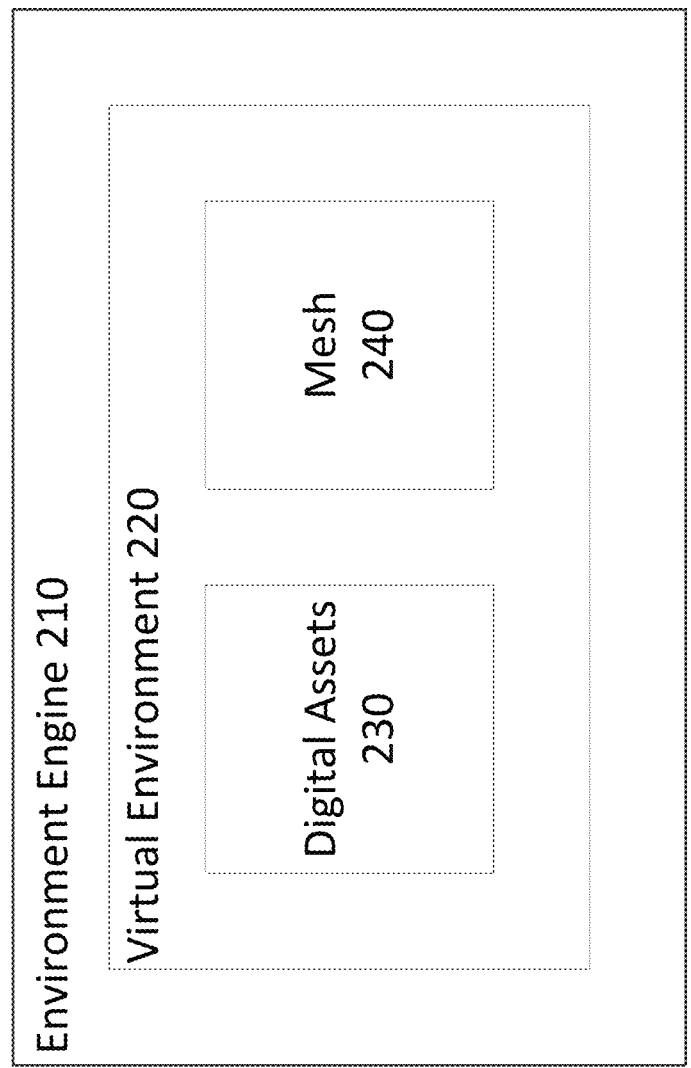
FIG. 2 shows an example content item.

Media content items designed for VR or AR settings may comprise one or more logical entities, which may or may not be situated in a hierarchy. FIG. 2 shows an example of a content item 200 comprising an environment engine 210, a virtual environment 220, digital assets 230, and a mesh 240.

As shown in FIG. 2, the digital assets 230 and the mesh 240 may be entities of the virtual environment 220. The virtual environment 220 may be an entity of the environment engine 210. In example embodiments, the environment engine 210 may comprise a set of rules and/or a set of attributes that entities, such as virtual environments and associated sub-entities, of the environment engine 210 may use. The environment engine 210 may define user input operations and rules of physics that apply to objects and interactions in virtual environments 220 that use the environment engine 210. Such an associated virtual environment 220 may then use the defined user input operations and rules of physics to determine how interactions between the user and digital assets 230 are performed and/or executed in the virtual environment 220 and how interactions between and among objects are performed and/or executed in the virtual environment 220. The virtual environment 220 may comprise any number of digital assets or media content items for a user to experience and/or interact with.

As shown in FIG. 2, the virtual environment 220 may comprise digital assets 230 and a mesh 240. A digital asset 230 may be any content item that a user may experience and/or interact with. For example, the digital assets 230 may comprise images or textures that create a virtual physical environment, such as an image of mountains in the distance that a user may view, a sand texture acting as the ground of the virtual physical environment, ambient effects, and other such environmental assets. Example digital assets 230 providing ambient effects in a virtual environment 220 may comprise fog, fire, weather, etc. Additionally, the digital assets 230 may comprise virtual objects or characters a user may interact with, such as a virtual character a user may move with input commands, an object a user may push or throw, virtual tools, and other interactive objects. Rules defined by the environment engine 210 may dictate how interactions with and among the digital assets 230 may occur.

The virtual environment 220 may comprise a grid or matrix of position data, such as (x, y, z) coordinates. This position data may be used to define where the digital assets 230 may be viewed relative to one another and may be of any feasible relative measurement. For example, a hammer may be at coordinate (1, 1, 1), and a nail may be at coordinate (2, 2, 1), where each (x, y, z) corresponds to one-foot by one-foot by one-foot cubes in the virtual environment 220. In other examples, the resolution of the environment, that is the volume of space represented by each coordinate, may be different. For example, the coordinate (1, 1, 1) may represent a one inch-by-one inch cube, or it could represent a sphere having a certain radius. Coordinates of the virtual environment 220 may comprise empty space. For example, coordinates may represent air or other empty region for a user to move about the environment without colliding with another digital asset, e.g., a user may move in coordinates between a ground digital asset and a sky digital asset to mimic walking on the ground in reality.

The mesh 240 may comprise a plurality of values corresponding to coordinates of locations in the virtual environment 220. The values of the mesh 240 may be stored or maintained in any suitable data structure and may reside in memory accessible by the environment engine 210 during use. For example, the values of the mesh 240 may be stored in or form a matrix in memory. Each value of the mesh 240 may correspond to a respective coordinate of the virtual environment and may represent a value of interest in the corresponding coordinate. In an example embodiment, a mesh may comprise interest values corresponding to (x, y) coordinates of the virtual environment 220 to create a three-dimensional matrix of the form (x, y, interest). In another example embodiment, a mesh may comprise interest values corresponding to (x, y, z) coordinates of the virtual environment 220 to create a four-dimensional matrix of the form (x, y, z, interest). Interest values may be highest at or near coordinates where there are points of interest and lowest at coordinates at midpoints between points of interest. For example, in a video game, collectible objects may be scattered throughout the virtual environment of the video game at specific (x, y, z) coordinates of the virtual environment. A mesh associated with such a video game may comprise a matrix having an interest value associated with each such coordinate of the virtual environment of the form (x, y, z, interest). Interest values may be highest at (x, y, z) coordinates containing a collectible object and lowest at (x, y, z) midpoints between collectible objects. In other examples, interest values may be lowest at such coordinates and highest between midpoints, dependent on implementation.

Additionally, mesh matrix values may be smoothed so that interest values near a peak interest value gradually decline to a lowest interest value. For example, mesh matrix coordinate (1, 1, 1, 5) may be a peak interest value in the virtual environment and may be surrounded by default or very low interest values, e.g., (1, 1, 0, 0), (1, 0, 1, 0), (0, 1, 1, 0), etc. To account for such extremes, interest values in the surrounding areas of the virtual environment may be raised to create more of a gradual rise in the mesh. In an example embodiment, smoothing may use an exponential curve. For example, if the peak interest value in an area of the mesh is 16, coordinates in a predetermined radius of the coordinate having the peak interest value may be given a value of 4, the square root of 16, and coordinates in the next predetermined radius may be given a value of 2, the square root of 4. Such a process may continue until the interest values approach zero. Coordinates between two peak interest values may be calculated via a predetermined mathematical formula. For example, opposing smoothing calculations may be averaged to calculate such a value. Smoothing may use any feasible mathematical function or combination of functions. For example, smoothing may use an exponential function, logarithmic function, linear function, etc.

Typically, in use, a mesh, such as mesh 240, is not displayed or made visible to a user. Rather, as described hereinafter, a mesh may be used to determine a desired or suitable location or position for an overlay or digital asset in the virtual environment 220. The virtual environment 220 may use a mesh to guide a user toward points of interest by determining desired positions and viewpoint orientations for the user and guiding the user from point to point. Viewpoint orientation may comprise a direction and field of view (i.e., which direction the user is looking and what the user sees in her field of view. Viewpoint orientation may be expressed either as a three-dimensional vector of Euler rotation angles, or as a four-dimensional quaternion more suitable for composition, interpolation and other mathematical treatment. The position of a user may be expressed as a three-dimensional vector, for example x, y, and z coordinates. Viewpoint orientation in combination with position of a user may be referred to as the user's "pose" within a virtual environment. Viewpoint orientation may be determined by the user device via existing methods. For example, information provided by sensors on a VR or AR headset may be used to determine a user's viewpoint orientation, and together with the user's position, the pose of the user. Based on the viewpoint orientation and position, i.e., pose, of a user, a field of view of the user in the virtual environment may be determined—that is, what the user sees in the virtual environment from his current position. Further, events may be triggered in the virtual environment that may change one or more meshes and/or create a new point of interest for a user. The user may then be guided using the changed mesh(es) and/or to the new point of interest.

Interest values of a mesh may be used to perform operations or calculations at specific positions or coordinates in the virtual environment 220. For example, in a virtual environment with planets in outer space, interest values may correspond to gravity around each planet, where higher values indicate greater gravitational pull. As a user moves through the virtual environment, the virtual environment may calculate physical forces to exert on the user to determine trajectory. A force similar to such a gravitational force may also be used when traversing a terrestrial environment to pull or steer the user to a specific location, such as a location with a collectible or a location with advertising. In another example, in a video game with a character losing health in a cold environment, interest values may correspond to relative heat in the cold environment. As the user moves the character closer to the heat source, denoted by higher interest values, health regeneration may be triggered and calculated based on the magnitude of current or surrounding interest values. Generally, interest values may be used to direct a user in and/or through a virtual environment 220.

A virtual environment 220 may comprise one or more meshes 240. Each mesh 240 may comprise a plurality of interest values based on differing criteria. For example, one mesh 240 may have interest values corresponding to collectible objects. Another example mesh 240 may have interest values corresponding to gravitational force. Yet another mesh 240 may have interest values corresponding to advertising locations. One or more meshes 240 may be used to direct a user in and/or through the virtual environment 220 at any given time.

Figure 3A:
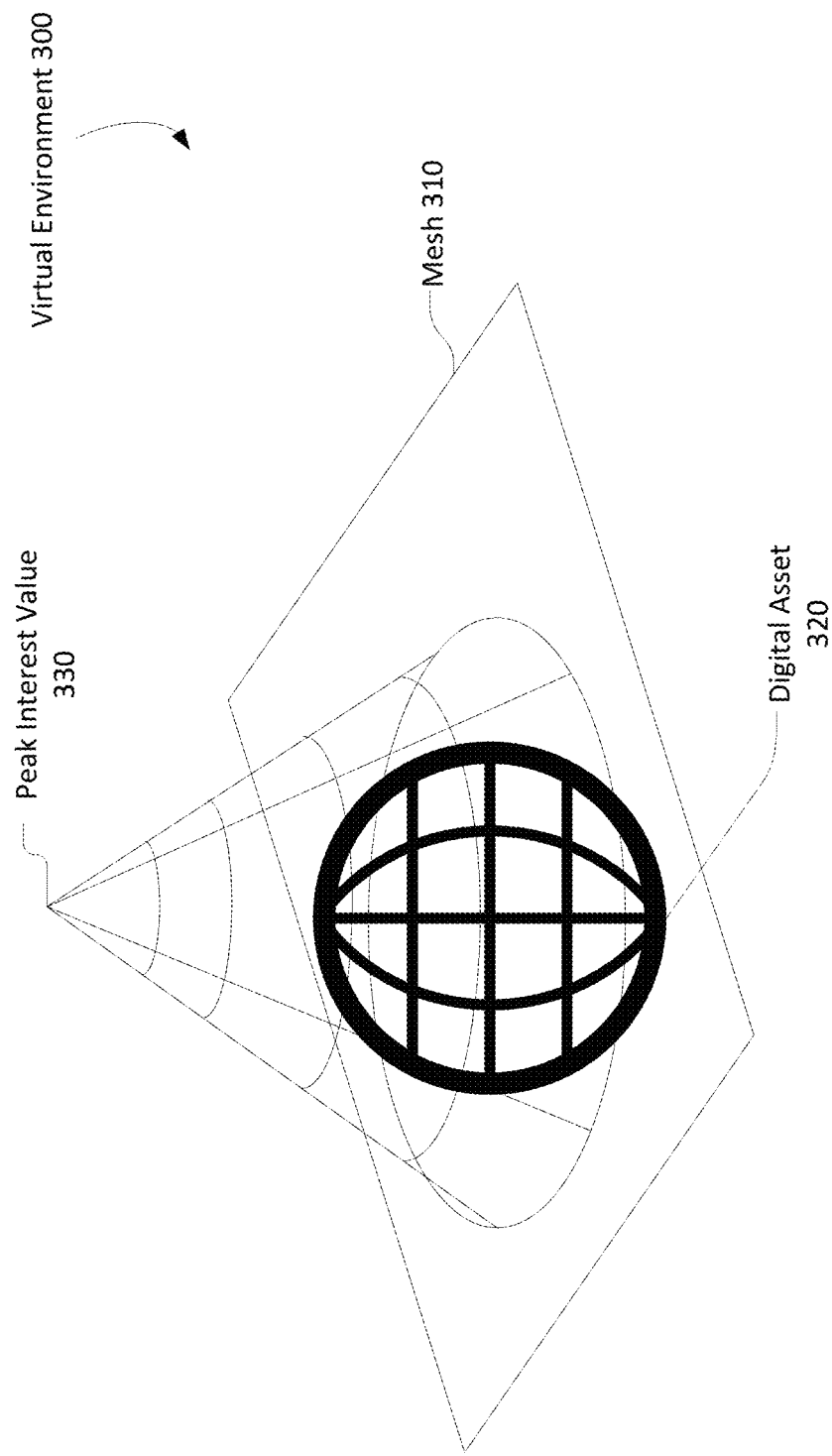
FIG. 3A shows an example visualization of a mesh.

FIG. 3A shows an example visualization of a mesh 310 of the form (x, y, interest) in a virtual environment 300. The virtual environment 300 may have a digital asset 320 in the shape of a sphere. The values of the mesh 310 may have been created, calculated, or assigned when the virtual environment 300 was created, or the values of the mesh 310 may have been generated, calculated, or assigned after or based on the assignment of a peak interest value 330. In FIG. 3A, an interest value was assigned to an (x, y) coordinate corresponding to the center of the digital asset 320. When the mesh 310 is created/generated, default interest values may be zero. Thus, the mesh 310 may be visualized as a plane, as illustrated by the parallelogram in FIG. 3A. When the mesh 310 is generated/adjusted to account for the assigned interest values at each coordinate, the assigned interest value deforms the mesh 310, for example, because the interest value has higher magnitude than the default of zero. Additionally, the assigned interest value has the highest magnitude of any immediately surrounding coordinates. Such an interest value may be referred to as a peak interest value 330. Without smoothing, the adjusted mesh 310 may be imagined or visualized as a plane with a single column at the coordinate of the peak interest value 330. However, with smoothing, interest values surrounding the peak interest value 330 may be adjusted to create a gradual increase from zero to the peak interest value 330. A mesh with values that have been smoothed from peak interest value to peak interest value may be imagined or visualized as a blanket laid over the virtual environment. Depending on the mathematical formula used for smoothing, the resulting mesh 310 may be visualized as the mesh 310 illustrated in FIG. 3A. Instead of a column at the peak interest value 330, interest values of coordinates surrounding the peak interest value 330 have been smoothed to create a cone shape around the digital asset 320, with the peak interest value 330 being the point of the cone.

Figure 3B:
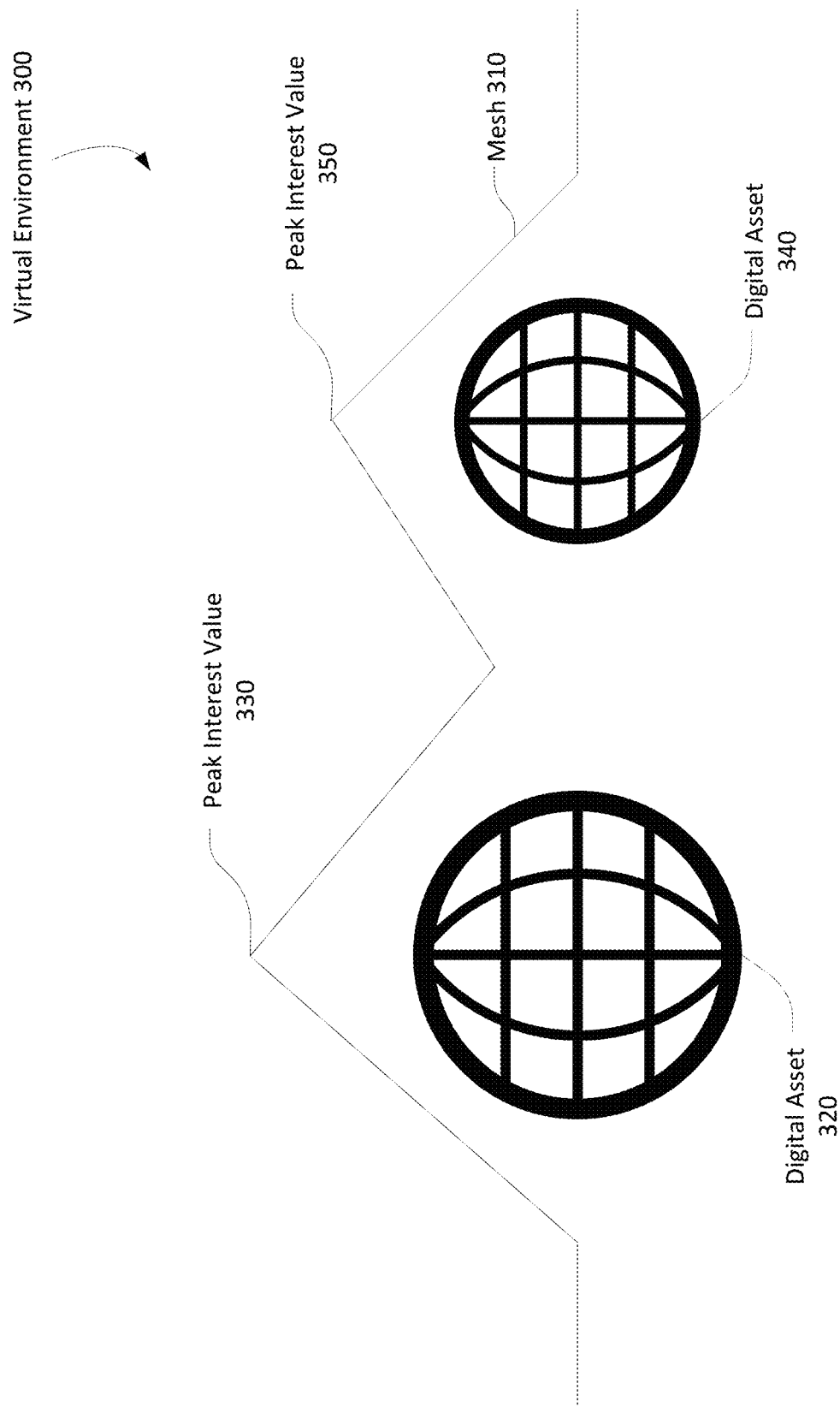
FIG. 3B shows another example visualization of a mesh.

FIG. 3B shows an example cross-section visualization of the virtual environment 300 with an additional digital asset 340. An interest value has been assigned to the (x, y) coordinate corresponding to the center of the digital asset 340. Because this assigned interest value is also of the highest magnitude of any immediately surrounding coordinates, this assigned interest value may also be a peak interest value, the peak interest value 350. The mesh 310 may be adjusted to account for the addition of peak interest value 350. Such an adjustment may occur during run-time of the virtual environment 300. Smoothing may again be performed. However, the peak interest value 350 is close enough to the peak interest value 330 that the smoothing functions may intersect between the digital assets 320 and 340. Smoothing may not continue beyond such an intersection so that the mesh matrix is not assigned conflicting interest values and so interest values are correctly represented. For example, the smoothing of peak interest value 330 should not override the smoothing of peak interest value 350; otherwise, the peak interest value 350 may be reduced to zero. Thus, smoothing may result in a non-zero interest value between the digital assets 320 and 340, which may indicate more interest to a user than the zero-interest portions of the mesh 310.

Figure 3C:
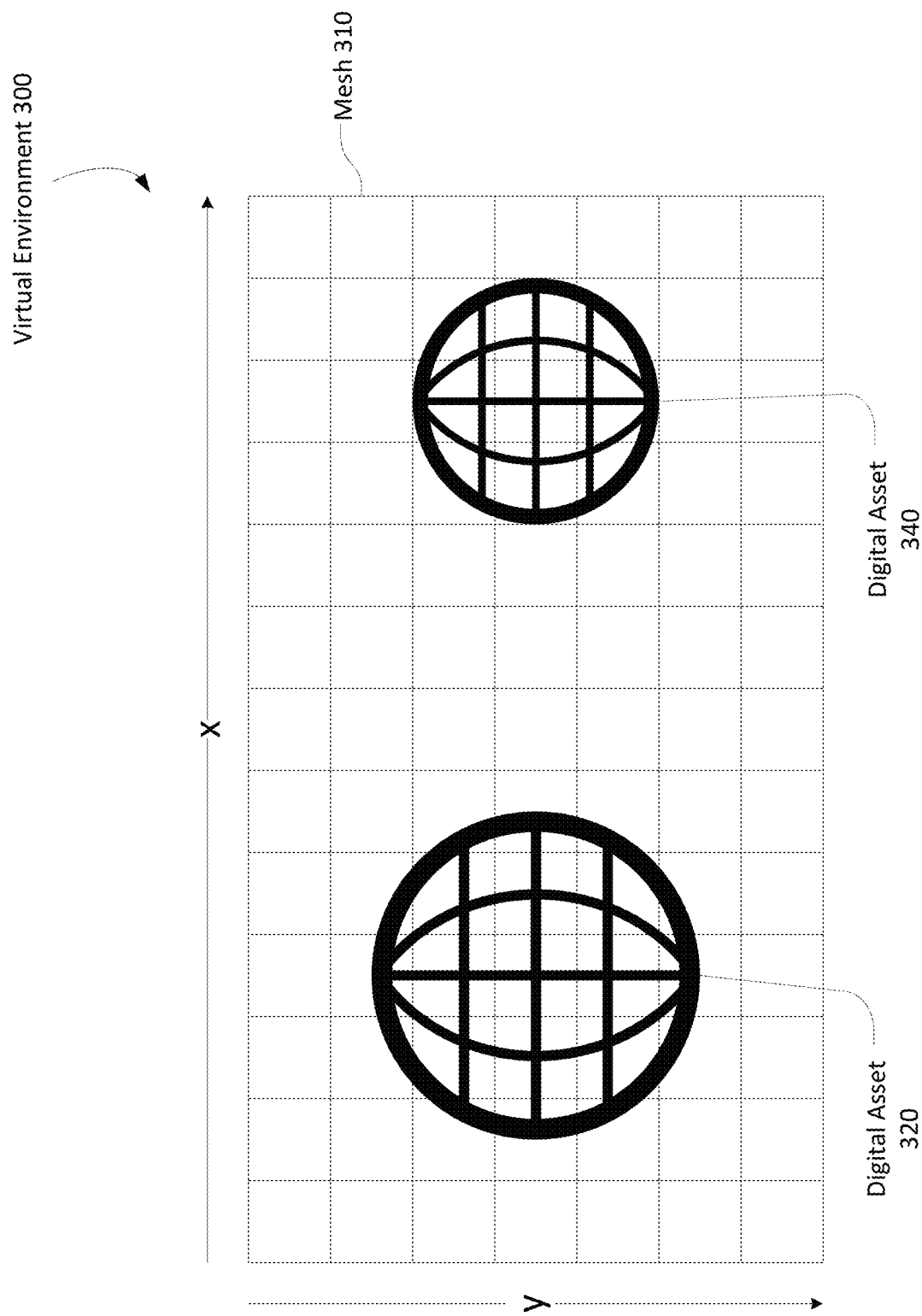
FIG. 3C shows an example visualization of the mesh of FIG. 3B.

FIG. 3C shows an example top-down visualization of the virtual environment 300 with digital asset 320 and digital asset 340. In this visualization, the mesh 310 is shown as a matrix of cells, where each cell has a respective (x, y) coordinate, as indicated by the 'x' and 'y' arrows on the top and left borders of the mesh 310, respectively. In FIG. 3C, the coordinates range from (0, 0) in the top left cell to (12, 6) in the bottom right cell. Each cell may have an interest value, which may correspond to assigned interest values, such as those assigned to digital assets 320 and 340, and may also correspond to interest values determined by the smoothing process described and shown in FIG. 3B.

Figure 3D:
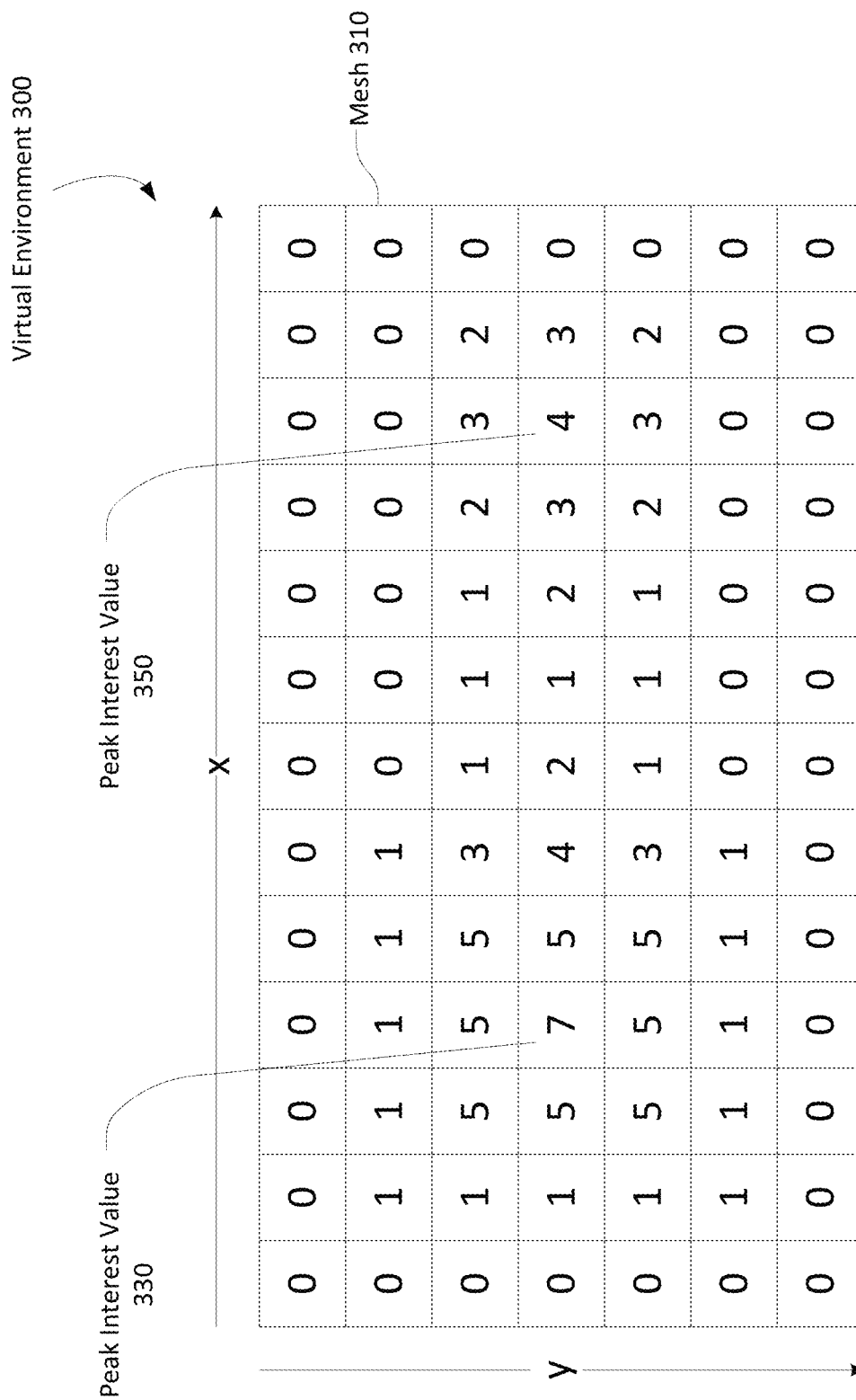
FIG. 3D shows another example visualization of the mesh of FIG. 3B.

FIG. 3D shows an example top-down visualization of the virtual environment 300 as a matrix of interest values assigned to the mesh 310. The digital assets 320 and 340 have been removed from FIG. 3D for clarity. In this example visualization, the peak interest value 330 has a value of seven ("7") at mesh coordinate (3, 3), and the peak interest value 350 has a value of four at mesh coordinate (10, 3). As further illustrated, smoothing may be performed at coordinates surrounding the peak interest value 330 and the peak interest value 350 to create a gradient of interest values over the entire virtual environment. In this example, zero ("0") is the lowest interest value for any coordinate.

The smoothing shown in FIGS. 3B and 3D is for illustrative purposes only and not to scale. Additionally, while the mesh in these example figures is illustrated in terms of how it may be visualized, generally, a mesh is not displayed to a user. However, a mesh or some visualization of it could be displayed to a content creator using a development tool, for example.

Figure 4:
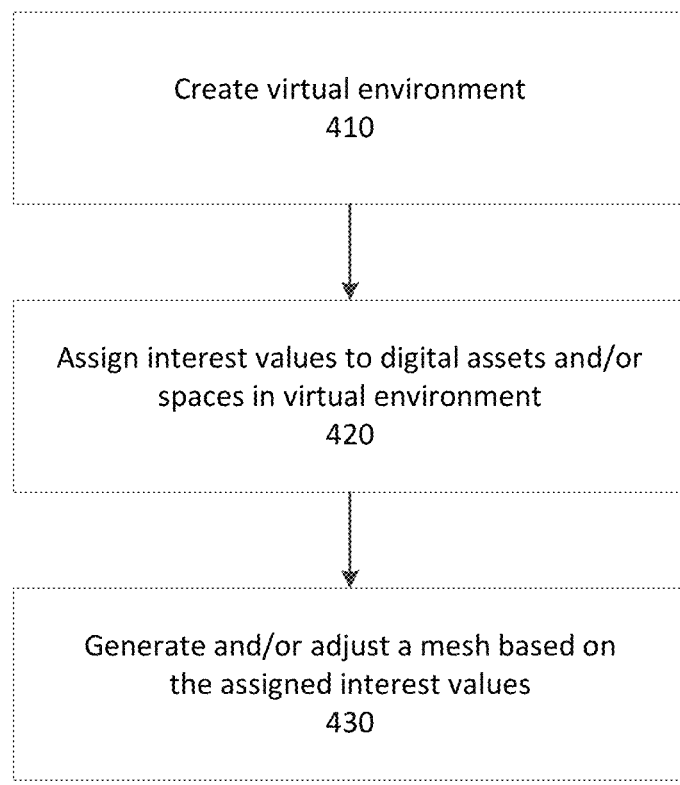
FIG. 4 is a flow diagram depicting an example process for creating a mesh.

FIG. 4 is a flow diagram depicting an example process for creating a mesh for use in a virtual environment, such as the virtual environment 220.

At block 410, a virtual environment may be created, such as a virtual environment 220. The virtual environment may be created by a content provider, such as a content provider 110, and the virtual environment may be stored and/or accessed via a content gateway, such as a content gateway 140. A user may then access the virtual environment using a user device, such as one of the user devices 170. The virtual environment may comprise digital assets, such as the digital assets 230, which a user may experience and/or interact with. The digital assets may be placed by the content provider or automatically generated, for example, by a procedural generation process. The virtual environment may utilize an environment engine, such as an environment engine 210, which may provide various rules for digital objects to follow in the virtual environment. Rules, such as physics rules and/or collision rules, defined by the environment engine may dictate how interactions with and among the digital assets may occur. The virtual environment may comprise a grid or matrix of position data, such as (x, y, z) coordinates, which may define where the digital assets may be viewed and interacted with relative to one another. The virtual environment may or may not also comprise a mesh, such as the mesh 240. The mesh may comprise a plurality of values corresponding to the position data of the virtual environment, where each value of the mesh may correspond to a value of interest in the associated position in the virtual environment, such as (x, y, z, interest). The values of the mesh may be stored or maintained in the form of a matrix, for example. At time of creation, the mesh may comprise default interest values, such as zero or one. Alternatively, the mesh may comprise a plurality of varying interest values.

At block 420, interest values may be assigned to digital assets and/or spaces in the virtual environment. In example embodiments, the content provider may assign interest values to digital assets or spaces in the virtual environment to attempt to direct the user to the coordinates of the virtual environment where those digital assets or spaces are located. In additional example embodiments, the content gateway and/or user device may assign such interest values. In an example, in a room of a building in a virtual environment, a blank space on a wall of the room may be assigned an interest value indicating the blank space is of interest to a user. The blank space may provide a desirable area to project a digital image onto at run-time, for example, when using an AR interface. The blank space may also be a desirable space for the content provider to include an advertisement at run-time when the user looks around the room. The digital asset or space may have an assigned coordinate in the virtual environment, which may be found by the mesh in the next step of the process. Alternatively, the content provider may assign interest values to specific coordinates of the virtual environment.

At block 430, a mesh may be generated and/or adjusted based on the assigned interest values. If a mesh was not created during creation of the virtual environment, a mesh may be generated using the assigned interest values. For each interest value assigned at a coordinate in the virtual environment, the mesh matrix may have a corresponding value. For example, if coordinate (1, 1, 1) was assigned an interest value of 5, the corresponding mesh matrix value may be (1, 1, 1, 5), indicating that coordinate (1, 1, 1) has an interest value of 5. If a mesh was created during creation of the virtual environment, the mesh may be adjusted using the assigned interest values. Using the above example, if coordinate (1, 1, 1) had a default interest value of 0 at creation time, indicated in the mesh matrix by (1, 1, 1, 0), the mesh may be adjusted to indicate the newly-assigned interest value: (1, 1, 1, 5). Such an adjustment or updating may occur for each coordinate assigned an interest value in the virtual environment. Or such an adjustment or updating may occur for only a subset of the coordinates in the virtual environment. After assignment of interest values, smoothing may occur, as described above. The result of the process of FIG. 4 may be an interest mesh indicating points of interest to a user. The process of FIG. 4 may be repeated to generate multiple meshes for a single virtual environment. Each such mesh may represent a different form of "interest" in the virtual environment. For example, one mesh may include interest values that represent areas of interest within a virtual environment at which it may be desirable or suitable to display an overlay or digital asset during runtime.

Figure 5:
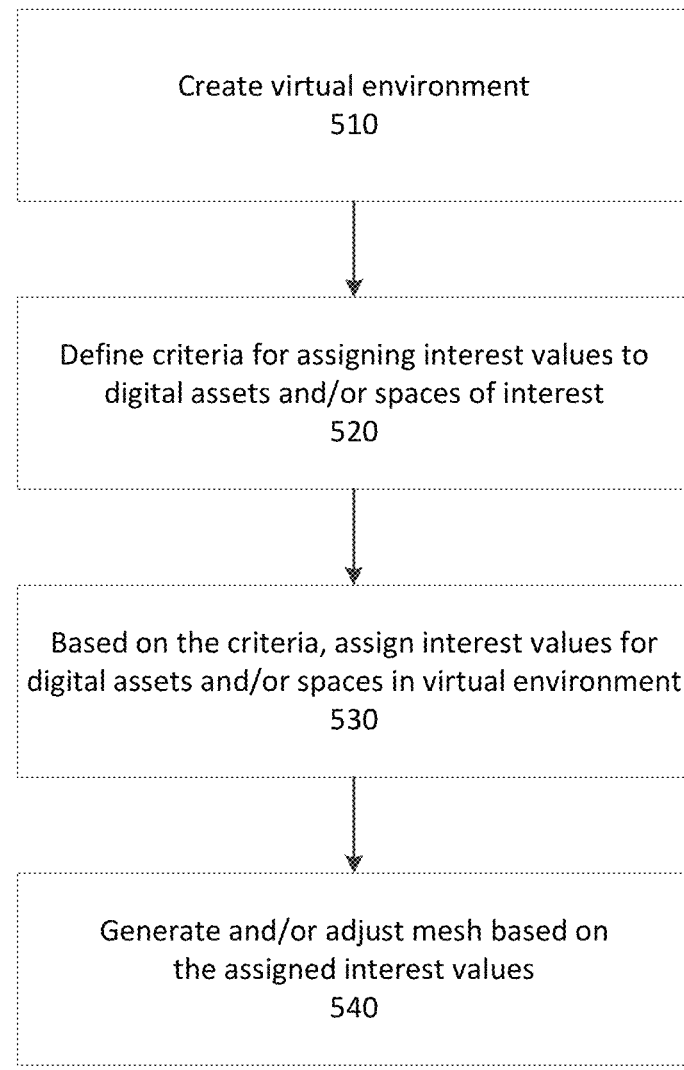
FIG. 5 is a flow diagram depicting another example process for creating a mesh.

FIG. 5 is a flow diagram depicting an example process for creating a mesh based on specified criteria.

At block 510, a virtual environment may be created, such as a virtual environment 220. The virtual environment may be created by a content provider in the same manner as the virtual environment that was created at block 410 of FIG. 4 above, and may or may not have an associated mesh.

At block 520, criteria may be defined for assigning interest values to digital assets and/or spaces of interest in the virtual environment. The content provider may define criteria that determines how digital assets and/or spaces in the virtual environment are assigned interest values. Such criteria may be any feasible metric by which digital assets or spaces may be compared. An example criterion may be a shape of a digital asset. For example, digital assets shaped similar to a soda can may be defined to have high interest because of the soda can's advertising capability. Another example criterion may be the rendering cost of a digital asset. For example, a digital asset providing fog to an area of the virtual environment may have a high rendering cost, so interest values associated with that area of the virtual environment may be very low when computing resources are scarce. Yet another example criterion may be suitability for a virtual overlay, as described with respect to FIG. 6, below.

At block 530, based on the criteria defined in block 520, interest values for the digital assets and/or spaces in the virtual environment may be assigned. Assignment of interest values may be performed by any feasible entity, such as the content provider, content gateway, or user device. Algorithms to assign interest values may be built into an environment engine executing the virtual environment or as part of the coding of virtual environment. For example, a user device, such as a user device 170, may use most of its available computing resources to render a basic virtual environment. Encountering a digital asset providing an ambient effect such as fog may strain the capabilities of the user device. As a result, based on the defined criteria from block 520, low interest values may be assigned to areas of the virtual environment attempting to render the ambient effect. The user may then be directed to avoid such areas to avoid straining the user device. In another example, all digital assets shapes likes soda cans may be given a high interest value so that users may later be directed toward these digital assets to interact with them. Interest values may be assigned during run-time as circumstances change. For example, as computing resources become available, interest values associated with digital assets that are costly to render may change value so that a user is not directed away from such digital assets. In another example, a user may focus, visually or otherwise, on area of the virtual environment even though the user is being directed away from that area. As a result, that area may be assigned a higher interest value regardless of its rendering cost so that the user may properly experience the area.

At block 540, a mesh may be generated and/or adjusted based on the assigned interest values. Such a process may follow that of block 430 of FIG. 4, above. The mesh may be adjusted during run-time as interest values change, as described above. In this manner, blocks 530 and 540 may be repeated throughout a user's experience. Additionally, the process of FIG. 5 may be repeated to generate multiple meshes for a single virtual environment.

An example criteria for creating a mesh may be suitability for placing an overlay. In an AR or VR environment, it may be desirable for a user device, such as a user device 170, to determine areas best suited to position an overlay or display of a digital asset. For example, in an AR environment, a headset or other user device may scan a physical room to determine areas that a virtual TV screen may be presented to the user.

Figure 6A:
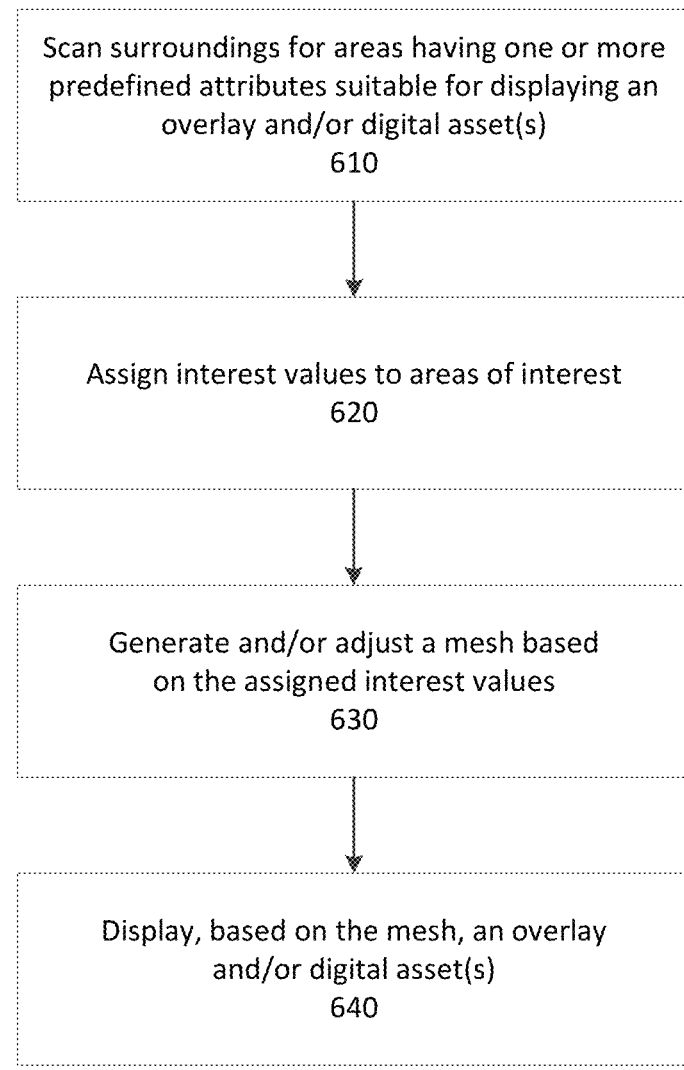
FIG. 6A is a flow diagram depicting yet another example process for creating a mesh.

FIG. 6A is a flow diagram depicting an example process for creating a mesh based on suitable places to display an overlay and/or digital asset.

Figure 6B:
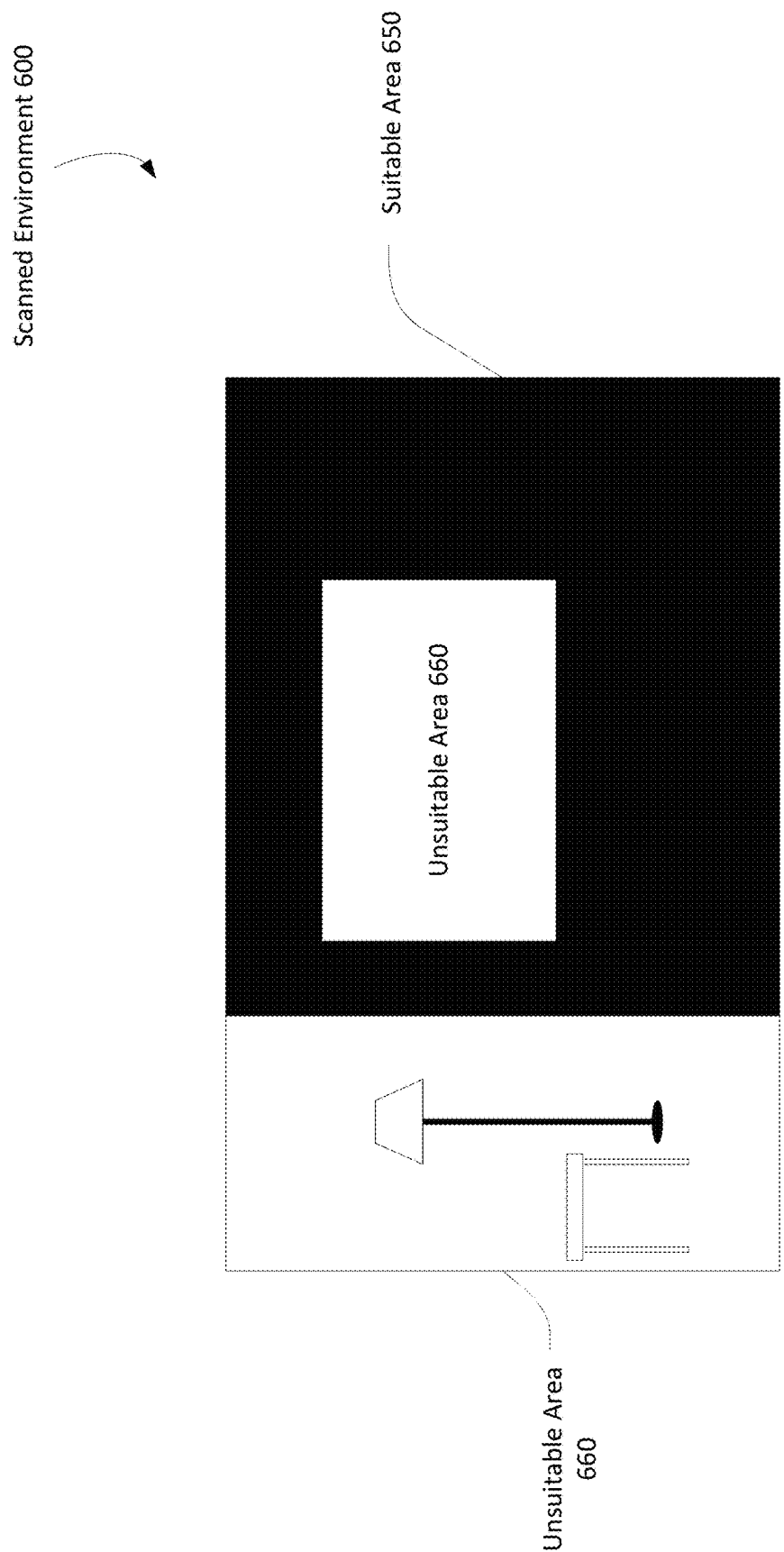
FIG. 6B shows an example of a scanned environment.

At block 610, a user device, such as a user device 170, may scan the user's surroundings for areas having one or more predefined attributes suitable for displaying an overlay and/or digital asset. The surroundings may be in a virtual environment, either an AR or VR environment, such as the virtual environment 220. Scanning may result in the generation of a scanned environment 600, a portion of which is shown in FIG. 6B. A user device, and/or other device(s) the user device may send the scanned environment 600 to such as a content provider or content gateway, may analyze and/or process the scanned environment 600 to search for the predefined attributes. Predefined attributes may be any attributes affecting display of an overlay or digital asset. For example, predefined attributes may be depth, distance, size, texture, color, brightness, or other attributes that may affect display of an overlay. A scan of the user's surroundings and/or analysis of the scanned environment 600 may find one or more of these predefined attributes and determine suitability for an overlay. For example, additive blending may affect colors a user sees when using an AR headset that projects virtual digital assets into the real world. Thus, large, dark areas may be most suitable for projecting an overlay or digital asset. In an example VR environment, walls, cliffs, or other similar large, blank surfaces may be suitable for displaying an overlay or digital asset. Scanned areas and/or digital assets may be identified as suitable or unsuitable for displaying an overlay. For example, in the portion of the scanned environment 600 shown in FIG. 6B, the area immediately surrounding the lamp and table may be identified as an unsuitable area 660 because the objects may obstruct the view of an overlay, and/or light emanating from the lamp may be too bright to project an overlay. Similarly, the whiteboard in the middle of the dark wall may be an unsuitable area 660 because the whiteboard may be too bright. The dark areas of the wall may be a suitable area 650 for an overlay provided that important parts of the overlay may not significantly overlap an unsuitable area 660. In another example, a soda can may be identified as having one or more of the predetermined attributes and may be identified as suitable for an overlay. As areas and/or digital assets are identified, a position of each identified area and/or digital asset may be stored relative to the virtual environment. Each identified area's and/or digital asset's relative position to the current position and viewpoint orientation of the user may also be stored. As a user traverses the environment, the user device and/or other device(s) may continue to identify and/or store suitable areas 650, unsuitable areas 660, and/or digital assets.

At block 620, interest values for areas of interest may be assigned. The user device, and/or other device(s), may assign interest values to the identified digital assets and/or areas found by scanning the user's surroundings. For example, a suitable area 650 may be assigned a high interest value, while an unsuitable area 660 may be assigned a very low or zero interest value.

At block 630, a mesh may be generated and/or adjusted based on the assigned interest values. Such a process may follow that of block 430 of FIG. 4, above. Such a mesh may be adjusted during run-time as interest values change as a user continues to view his surroundings. In this manner, blocks 610, 620, and 630 of FIG. 6A may be repeated throughout a user's experience to generate and/or adjust multiple meshes for a single virtual environment.

At block 640, the user device, and/or other device(s), may display an overlay and/or digital assets based on the mesh. When there is a need to render an overlay and/or digital asset, the mesh may be used to direct the user to a suitable area 650. The user may then be guided to the suitable area 650, and the overlay and/or digital asset may be displayed to the user. Additionally or alternatively, a suitable area 650 may be retrieved from storage. The interest value of the suitable area 650 may be increased to adjust the mesh so that the user may be directed to the suitable area 650. In an example embodiment, a content provider may wish to display an advertisement to the user. The content provider may retrieve an optimally suitable area 650 from computer memory and increase the interest value of the suitable area 650 substantially. The mesh may adjust based on this increase, and may then be used to direct the user to the suitable area 650. The user may also be guided directly to a suitable area 650 without using or adjusting the mesh.

The process of FIG. 6A may be repeated throughout a user's experience to display various overlays and/or digital assets to the user.

Figure 7A:
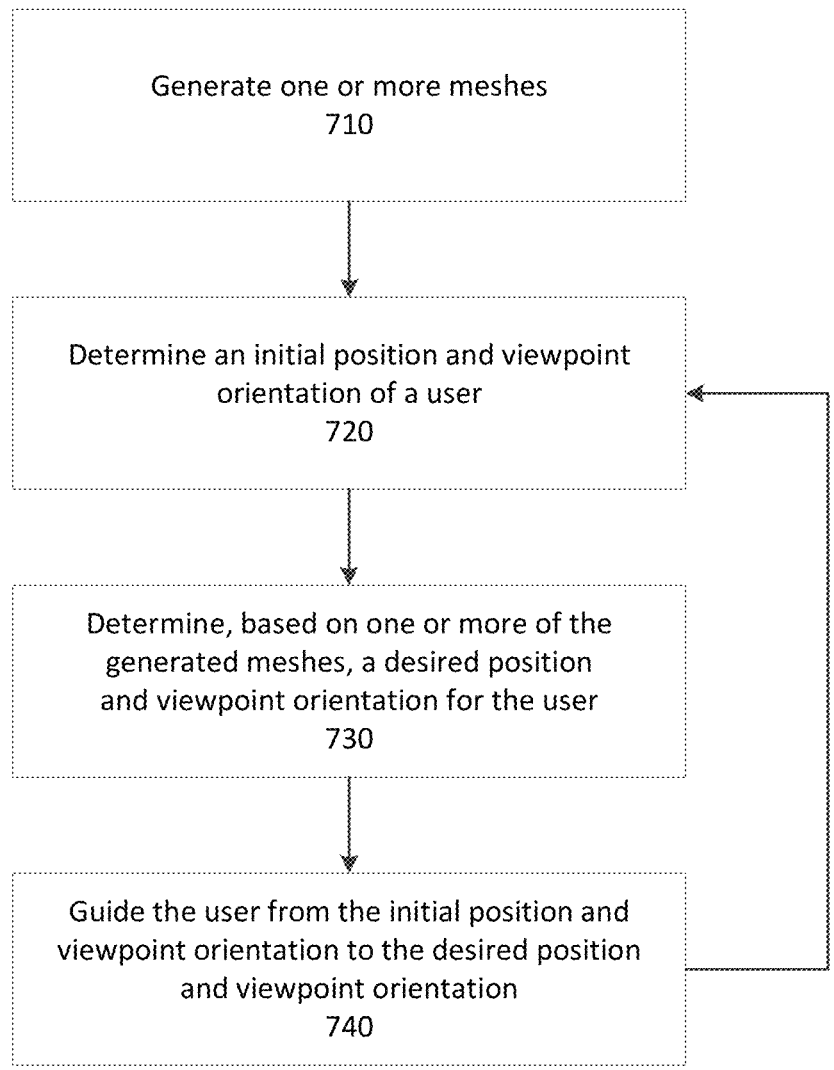
FIG. 7A is a flow diagram depicting an example process for directing a user using a mesh.

FIG. 7A is a flow diagram depicting an example process for directing a user using a mesh.

At block 710, one or more meshes may be generated. A mesh may be generated in a virtual environment, such as the virtual environment 220, in any feasible manner, such as those described above. A content provider may wish to direct a user to a specific location in the virtual environment. For example, the content provider may wish to show a narrative element or an advertisement to the user.

At block 720, an initial position and viewpoint orientation of the user may be determined. In order to direct the user to a location, the content provider must first determine where the user is located in the virtual environment and what direction the user is looking in the virtual environment, i.e., what the user is viewing in the virtual environment. User position may be implemented in the form of (x, y, z) coordinates or any other feasible manner. Viewpoint orientation may be determined by the user device via existing methods. For example, information provided by sensors on a VR or AR headset may be used to calculate the user's viewpoint orientation. Based on the user's viewpoint orientation and position, i.e., pose, a field of view of the virtual environment may be determined—that is, what the user sees in the virtual environment given that pose.

At block 730, a desired position and viewpoint orientation for the user may be determined based on one or more of the generated meshes. The interest values of a mesh, or the combined interest values of multiple meshes, may be used to determine a movement path and/or viewing path from the user's current position and viewpoint orientation through the virtual environment to the location specified by the content provider. For example, the user may need to be directed from location A to location B. The system may determine to direct the user to a closest peak interest value of the mesh(es) at location C, which is in the direction of location B. Such a location C may be determined by calculating a path through coordinates of interest from location A to location B. Such a calculation may be logically similar to gravitational calculations around celestial objects in a simulated outer space environment; each celestial body may have a certain amount of gravity, which may pull the user toward the celestial body as the user moves throughout outer space. Traveling from the Earth to the Sun may involve being diverted towards Venus and Mercury because of the gravitational pull of each planet. Using logically similar calculations, a user path may be determined using interest values in lieu of gravity. This calculated path may then be used to determine the desired position and viewpoint orientation of the user. Paths may be of any shape, such as curves in the outer space environment, or straight lines, such as moving from point to point in a terrestrial environment.

At block 740, the user may be guided from the initial position and viewpoint orientation to the desired position and viewpoint orientation. Various methods may be used to direct a user to a desired location.

For example, haptic cues may be used to guide a user. For example, a vibration or sensation of touch may be applied in a desired direction to attempt to direct the user in that direction.

Audio cues may also be used to guide a user. An audible noise may be played from the direction the user should be directed to. For example, if the user should be directed to turn to the right, a noise may be played and/or balanced in the right ear of the user. To turn the user around, repeated audio cues to the left or right may be played and/or back channel speakers may be used to simulate noise behind the user. If the user does not respond in the desired manner, the audio cue may be adjusted. For example, a volume of the audio cue may be increased, a pitch may be changed, a tone may be changed, and/or any other noticeable change may be made. In an example embodiment, an audio cue may comprise a purring noise behind the user. If the user does not turn around, a roar may be used, which may scare the user into turning around. Audio cues may also be adjusted based on the user's position and viewpoint orientation. For example, as the user moves closer to a source of an audio cue, the volume may increase. To maintain the immersive experience of the virtual environment, audio cues may be from a soundtrack of the virtual experience, represent a digital asset in the virtual environment, and/or be subtle enough to avoid breaking user immersion in the virtual environment.

Visual cues may also be used to guide a user. For example, a jitter, wiggle, or other motion may be added to the edge of the user's field of view. Noticing a movement in peripheral vision may induce the user to turn toward that direction. For example, if the user should be directed to turn to the right, pixels may be moved, brightened, made to sparkle, or otherwise changed on the right edge of the user's field of view to simulate catching a glimpse of something on the user's right side. Repeating such pixel anomalies may direct the user to turn in the desired direction. Another example of a visual cue may comprise the movement of digital assets in the desired direction. For example, in a virtual beach environment, a virtual flock of seagulls may be rendered at or near the user's location and may fly in the desired direction. The user may visually follow the seagulls as the seagulls move out of the user's field of view. Once the user is in the desired direction, the seagulls may fly off into the distance, disappear, and/or be overtaken by a digital asset it is desirable for the user to view, such as narrative element or an advertisement.

Blocks 720, 730, and 740 may be repeated throughout the user's experience to guide the user from location to location in the virtual environment. For example, from location C, above, the process may be repeated to find a location D, which is also in the direction of location B. Once at location B, the content provider may determine another location for the user to travel to.

Figure 7B:
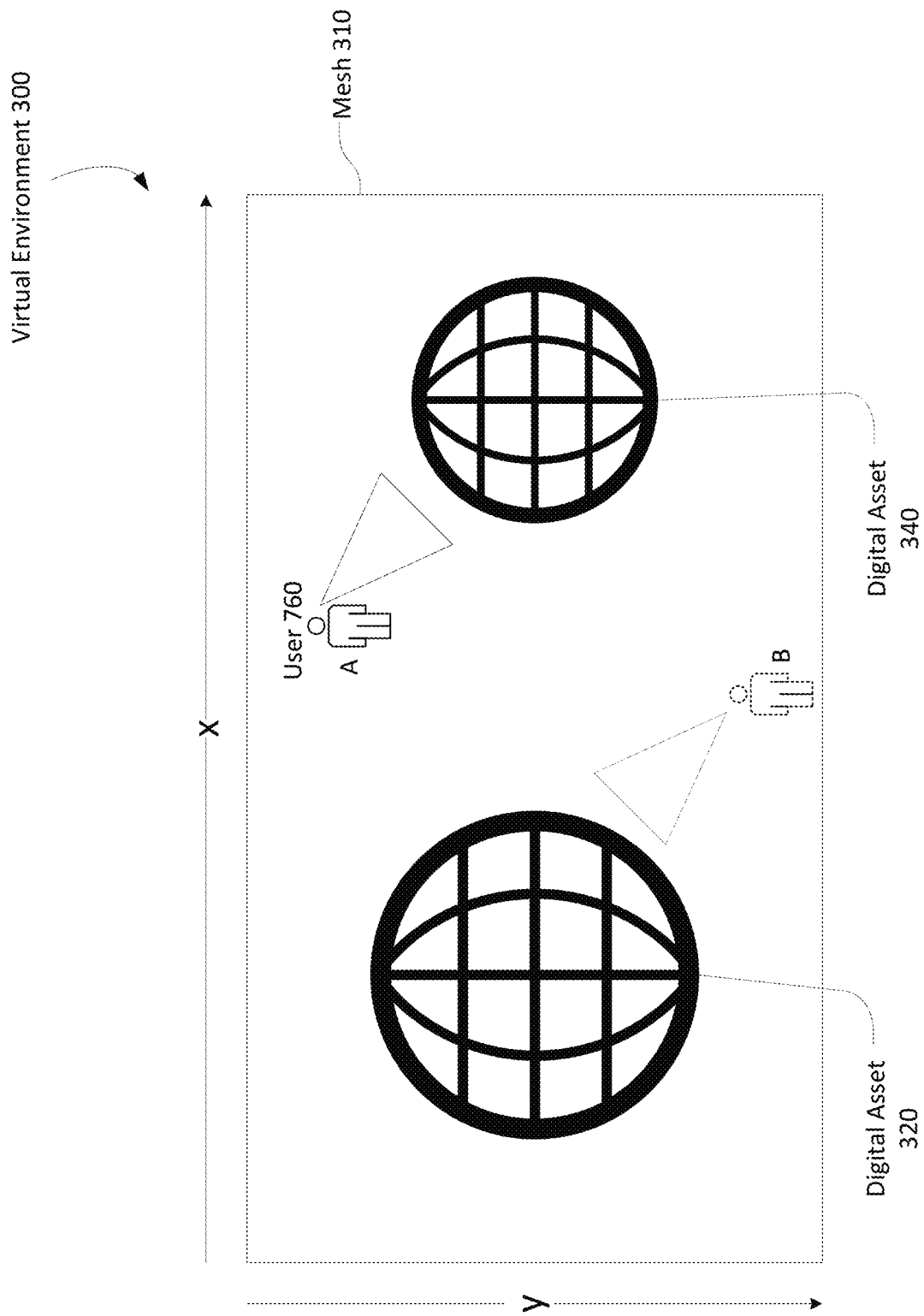
FIG. 7B shows an example of a current position and viewpoint orientation of a user and a desired position and viewpoint orientation of the user.

FIG. 7B shows an example of a current position and viewpoint orientation of a user in the virtual environment 300 (denoted by "A" in the figure) and a desired position and viewpoint orientation of the user in the virtual environment 300 (denoted by "B" in the figure). The mesh 310 may have been generated in accordance with FIGS. 3A-3D. As shown, a user 760 may be viewing the digital asset 340 at an initial position and viewpoint orientation, A. Based on the mesh 310, a desired position and viewpoint orientation, B, of the user 760 may be determined, shown as dotted lines in FIG. 7B. For example, a narrative element or advertisement associated with the digital asset 320 may be viewable at the desired position and viewpoint orientation B. The user 760 may then be guided from the initial position and viewpoint orientation A to the desired position and viewpoint orientation B using methods such as those described in regard to block 740 of FIG. 7A.

Figure 8A:
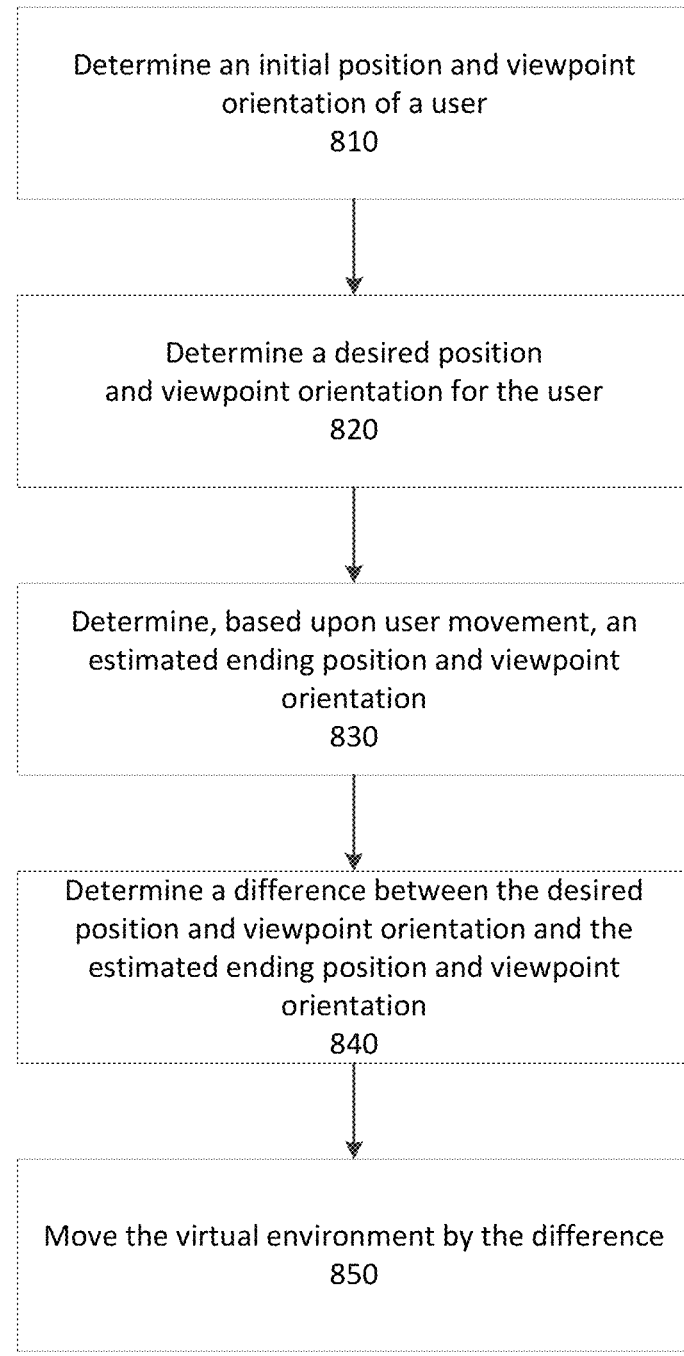
FIG. 8A is a flow diagram depicting another example process for directing a user in a virtual environment.

FIG. 8A is a flow diagram depicting another example process for directing a user in a virtual environment.

At block 810, an initial position and viewpoint orientation of a user may be determined. Such a process may follow that of block 720 of FIG. 7A.

At block 820, a desired position and viewpoint orientation for the user may be determined. Such a desired position and viewpoint orientation may be determined based upon one or more meshes, in accordance with block 730 of FIG. 7A. Additionally, a content provider may wish to introduce a narrative element, or other digital asset, at a specific position and viewpoint orientation regardless of the inclusion of one or more meshes. The content provider may wish to direct the user to that specific position and viewpoint orientation.

At block 830, an estimated ending position and viewpoint orientation may be determined based upon user movement. The user device, and/or other device(s), may detect when a user begins to move. Based on a speed and direction of movement, the device(s) may determine an estimated ending position and viewpoint orientation. For example, when a user turns his head, his head may start from resting position, speed up until reaching maximum speed, then slow down until again reaching resting position. Similarly, when a user walks or runs, he may start from a resting position, speed up until reaching maximum speed, then slow down until reaching resting position.

At block 840, a difference between the desired position and viewpoint orientation and the estimated ending position and viewpoint orientation may be determined. A difference between the estimated ending position and viewpoint orientation and the desired position and viewpoint orientation may be calculated by subtracting the estimated ending position and viewpoint orientation from the desired ending positions and viewpoint orientation, or vice versa. The difference may be the remaining distance the user needs to travel to arrive at the desired position. For example, assume the desired viewpoint orientation is behind the user, e.g., 180 degrees. The estimated viewpoint orientation, based on the head movement of the user, may be 80 degrees. Thus, the difference between the estimated viewpoint orientation and desired viewpoint orientation may be 180−80=100 degrees. Such a difference may be determined by the user device and/or other device(s) used for the user experience.

At block 850, the virtual environment may be moved by the difference. Moving the virtual environment by the difference determined at block 840 may allow the user to arrive at the desired position and viewpoint orientation without physically moving to the desired position and viewpoint orientation. The virtual environment may be moved by the content provider, the content gateway, or the user device, if capable. Using the above example, the virtual environment may be spun 100 degrees to make up the difference between the estimated viewpoint orientation and the desired viewpoint orientation. In other examples, the virtual environment may be moved and/or spun the same direction the user is moving in.

Figure 8B:
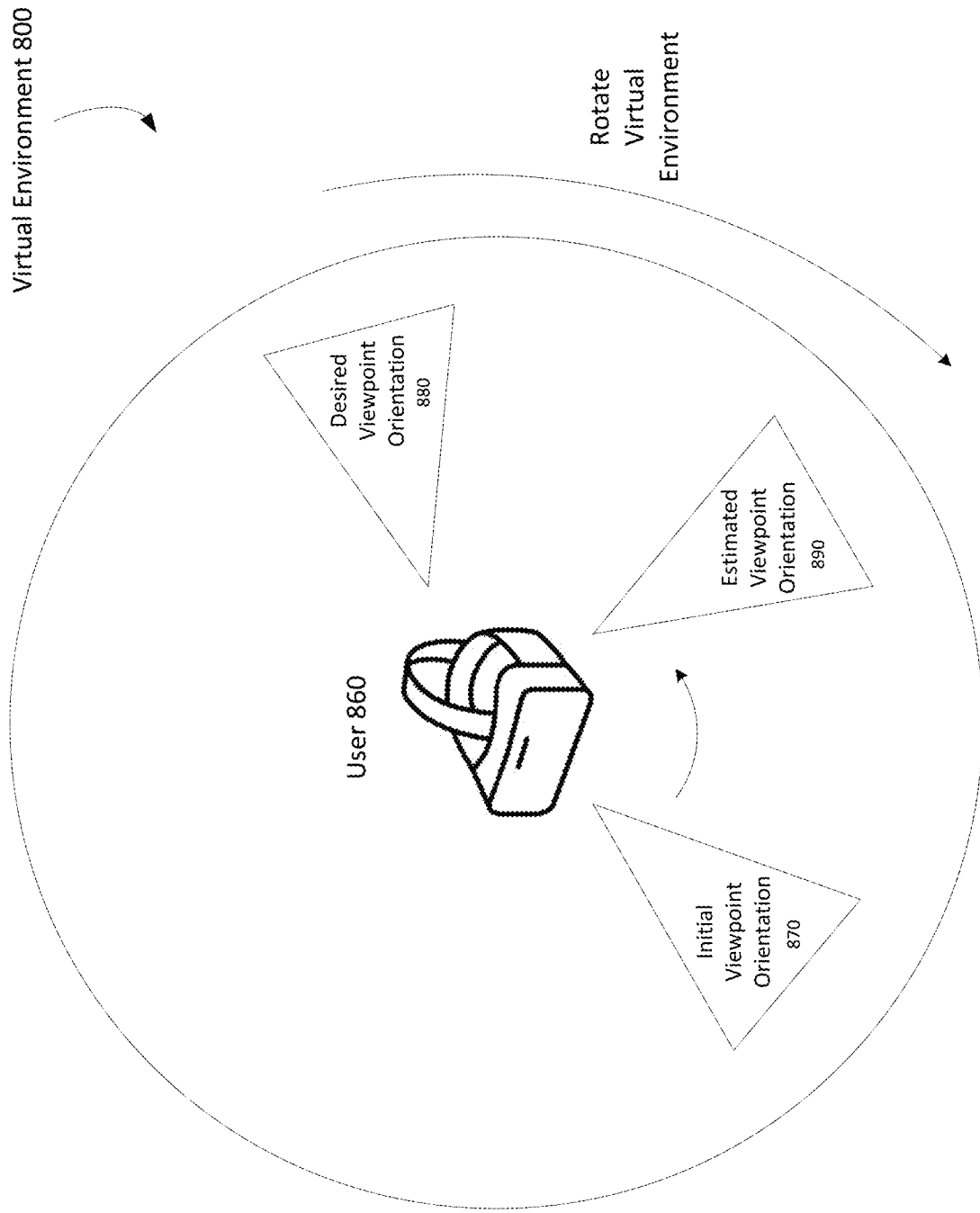
FIG. 8B shows an example of moving a virtual environment around a user.

An example of moving a virtual environment is shown in FIG. 8B. A user 860 may be viewing a virtual environment 800 at an initial viewpoint orientation 870. A content provider may determine the user 860 should look at a desired viewpoint orientation 880. For example, a narrative element or advertisement may be viewable at the desired viewpoint orientation 880. The user 860 may move his head to his left. Based on the movement speed of the user 860, an estimated viewpoint orientation 890 may be determined. A difference may be determined between the desired viewpoint orientation 880 and the estimated viewpoint orientation 890 by radially subtracting the estimated viewpoint orientation 890 from the desired viewpoint orientation 880. The virtual environment 800 may then be rotated by this difference. The end result may be the user 860 facing the desired viewpoint orientation 880 instead of the estimated viewpoint orientation 890.

The process of FIG. 8A may be used to make a user experience more seamless for the user while still providing guidance through a virtual environment. In an example, a narrative for the user may intend for the user to make a left turn. However, the user could make a right turn and continue the narrative because the virtual environment was rotated to compensate for the incorrect turn. Motion-stabilizing effects may be added to the user experience to help avoid motion sickness, e.g., restricting the field of view during fast movement between the actual and desired viewpoint orientations. Other techniques, such as stretching and/or motion blur may be used to maintain the movement effect in the event the system overestimates or underestimates the estimated position and viewpoint orientation at which the user will arrive.

Figure 9:
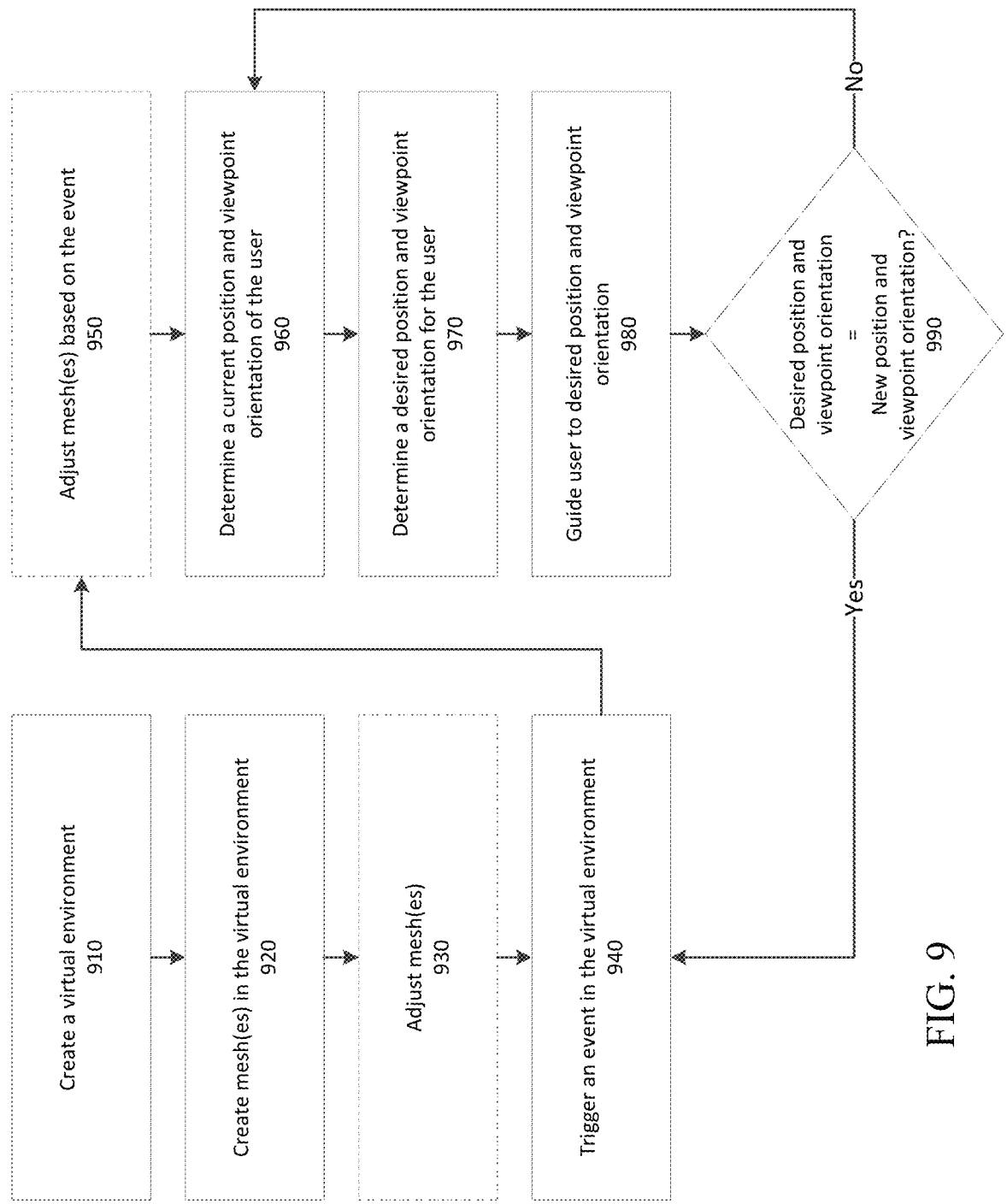
FIG. 9 is a flow diagram depicting yet another example process for directing a user in a virtual environment.

FIG. 9 is a flow diagram depicting yet another example process for directing a user in a virtual environment.

At block 910, a virtual environment may be created, such as a virtual environment 220. The virtual environment may be created by a content provider in the same manner as the virtual environment that was created at block 410 of FIG. 4 or block 510 at FIG. 5, above.

At block 920, one or more meshes may be created in the virtual environment, such as a mesh 240. The mesh may be created in the same manner as the meshes of FIG. 4 and/or FIG. 5. A plurality of meshes may be created based on differing criteria, to allow the system of FIG. 1 to direct the user through the virtual environment in a variety of ways.

Optionally, at block 930, one or more of the meshes may be adjusted. For example, meshes may be adjusted if interest values are assigned to specific digital assets and/or spaces in the virtual environment, in accordance with FIG. 4, and/or if interest values are assigned based on criteria, in accordance with FIG. 5.

At block 940, an event may be triggered in the virtual environment. A content provider, such as the content provider 110, may trigger an event that changes the virtual environment in some way. For example, a narrative element may be inserted into the environment, such as a new digital asset or area that a user may interact with. In another example, an advertisement may be inserted into the virtual environment.

Optionally, at block 950, one or more of the meshes may be adjusted based on the event. For example, the event may comprise adding new interest values to the virtual environment. As a result, one or more meshes may be adjusted to account for these new interest values, e.g., in accordance with FIG. 4 and/or FIG. 5.

At block 960, a current position and viewpoint orientation of the user may be determined. In order to direct the user to a location, the content provider must first determine where the user is located in the virtual environment and what direction the user is viewing. User position may be implemented in the form of (x, y, z) coordinates or any other feasible manner. Viewpoint orientation may be determined by the user device. Such a determination may be made in accordance with that performed in block 720 of FIG. 7A and/or block 810 of FIG. 8A.

At block 970, a desired position and viewpoint orientation for the user may be determined. Such a desired position and viewpoint orientation may be determined based on one or more of the meshes of the virtual environment and may be performed in accordance with block 730 of FIG. 7A. For example, the interest values of a mesh, or the combined interest values of multiple meshes, may be used to determine a movement path and/or viewing path from the user's current position and viewpoint orientation through the virtual environment to the event location specified by the content provider. A desired position and viewpoint orientation may also be determined based upon the event. For example, the introduction of a narrative element, or other digital asset, may determine a specific position and viewpoint orientation regardless of the inclusion of one or more meshes, as determined in block 820 of FIG. 8A.

At block 980, the user may be guided to the desired position and viewpoint orientation. Guiding may or may not be based on one or more meshes and may be based on any feasible manner described herein. For example, haptic, audio, and/or visual cues may be used to guide the user around the virtual environment, such as the guiding performed in block 740 of FIG. 7A. Additionally, the virtual environment may be moved based on estimated movements by the user, e.g., in accordance with the process of FIG. 8A.

At block 990, the system may check if the desired position and viewpoint orientation of the user is equal to the current position and viewpoint orientation of the user. If the current and desired positions and viewpoint orientations are not equal, the process may continue to block 960 and repeat until the user is guided to the desired position and viewpoint orientation. If the current and desired positions and viewpoint orientations are equal, then the process may continue at block 940, and another event may be triggered in the virtual environment. Such a process may continue throughout the user experience to guide the user through the virtual environment.

Figure 10:
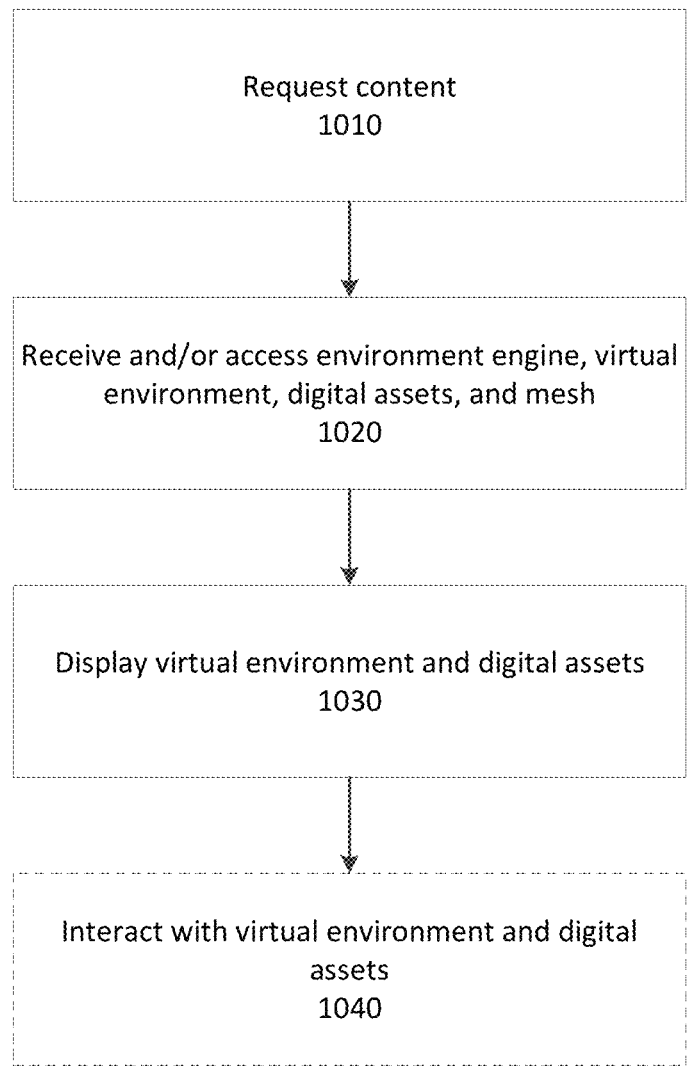
FIG. 10 is a flow diagram depicting an example process for receiving and displaying a virtual environment.

FIG. 10 is a flow diagram depicting an example process for receiving and displaying content with a user device, such as one of the user devices 170.

At block 1010, the user device may request content from a content gateway, such as the content gateway 140. Such a request may be of any suitable form and may comprise a request for a content item, such as a virtual environment. For example, a VR headset may request to watch a virtual environment associated with a movie from a communicatively connected set top box. In another example, a smartphone may request to access a virtual environment via a web interface.

At block 1020, the user device may receive and/or access an environment engine, a virtual environment, digital assets, and/or a mesh associated with the content item. Before being able to display, or output for display, a virtual environment such as those described herein, the user device may need to download or otherwise receive and/or access such parts of the virtual environment. For example, the user device may need to download digital assets and associated coordinates to be able to display the digital assets in the virtual environment for the user.

At block 1030, the user device may display, or output for display, the received and/or accessed virtual environment and digital assets. For example, after receiving the environment engine, the virtual environment, the digital assets, and/or the mesh, a VR headset may populate the virtual environment with the digital assets and place the digital assets at their associated coordinates. The VR headset may then display the virtual environment to the user via an integrated display. Note that the environment engine and mesh will not be visible to a user.

At block 1040, the user device may optionally interact with the virtual environment and digital assets. After displaying the user interface to a user, the user may interact with the virtual environment and/or digital assets, as described herein. For example, a VR headset may enable a user to view and manipulate digital assets in the virtual environment.

Although FIGS. 4, 5, 6A, 7, 8A, 9, and 10 are each depicted as a sequence of blocks, each depicted sequence should not be construed as limiting the scope of the present disclosure. In various cases, aspects, and embodiments, the blocks and described operations may be altered, omitted, reordered, or performed in parallel. For purposes of illustration, reference may be made to the systems described in connection with FIGS. 1 and 2, although any suitable network and systems may be used to implement the described processing.

Figure 11:
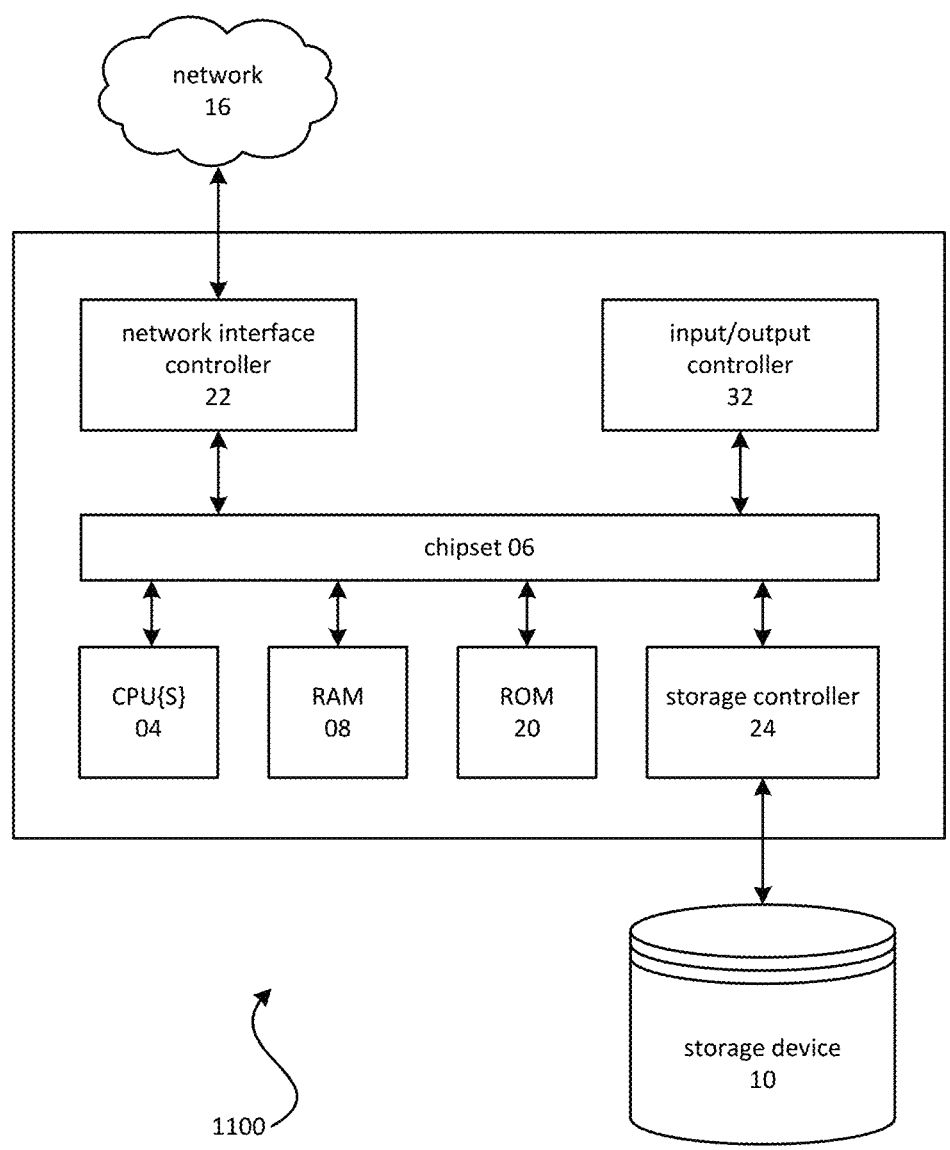
FIG. 11 shows an example computing system.

FIG. 11 depicts an example computing device in which various aspects of the systems and methods described herein may be embodied, such as any of the various devices and/or components depicted in FIGS. 1-3D or any of the steps or operations illustrated in FIGS. 4, 5, 6A, 7, 8A, 9, and 10. The computing device shown in FIG. 11 may correspond to a set-top box, remote control device, home automation system, desktop computer, laptop, tablet, network appliance, e-reader, smartphone, the content provider 110, the content gateway 140, the user devices 170, or other computing device, and may be utilized to execute any aspects of the components described herein, such as to implement the operating procedures of FIGS. 4, 5, 6A, 7, 8A, 9, and 10 or aid in the creation of any of the environments of FIGS. 2, 3A-B, 6B, and 8B.

A computing device 1100 may include a baseboard, or "motherboard," which is a printed circuit board to which a multitude of components or devices may be connected by way of a system bus or other electrical communication paths. One or more central processing units ("CPUs") 04 may operate in conjunction with a chipset 06. The CPU(s) 04 may be standard programmable processors that perform arithmetic and logical operations necessary for the operation of the computing device 1100.

The CPU(s) 04 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 04 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 06 may provide an interface between the CPU(s) 04 and the remainder of the components and devices on the baseboard. The chipset 06 may provide an interface to a random access memory ("RAM") 08 used as the main memory in the computing device 1100. The chipset 06 may further provide an interface to a computer-readable storage medium, such as a read-only memory ("ROM") 20 or non-volatile RAM ("NVRAM") (not shown), for storing basic routines that may help to start up the computing device 1100 and to transfer information between the various components and devices. The ROM 20 or NVRAM may also store other software components necessary for the operation of the computing device 1100 in accordance with the aspects described herein.

The computing device 1100 may operate in a networked environment using logical connections to remote computing nodes and computer systems through a local area network ("LAN") 16. The chipset 06 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 1100, connecting the computing device to other types of networks and remote computer systems.

The computing device 1100 may be connected to a mass storage device 10 that provides non-volatile storage for the computing device 1100. The mass storage device 10 may store system programs, application programs, other program modules, and data, used to implement the processes and systems described in greater detail herein. The mass storage device 10 may be connected to computing device 1100 through a storage controller 24 connected to the chipset 06. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1100 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 1100 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 10 by detecting the physical states or characteristics of one or more particular locations within the physical storage units.

In addition to the mass storage device 10 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 1100. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 1100.

The mass storage device 10 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 04 transition between states, as described above. The computing device 1100 may have access to computer-readable storage media storing computer-executable instructions, which, when executed by the computing device 1100, may perform operating procedures depicted in FIGS. 4, 5, 6A, 7, 8A, 9, and 10 or aid in the creation of any of the environments of FIGS. 2, 3A-B, 6B, and 8B.

The computing device 1100 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing node may be a physical computing device, such as the computing device 1100 of FIG. 11. A computing node may also include a virtual machine host process and one or more virtual machine instances operating on a physical computing device, such as the computing device 1100. Computer-executable instructions may be executed by the physical hardware of a computing device indirectly through interpretation and/or execution of instructions stored and executed in the context of a virtual machine.

Applicant has described methods and systems for the creation of one or more interest meshes that may calculate interest values or be given interest values associated with points of interest in a virtual environment. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-executable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

The invention claimed is:

1. A method comprising:
 applying, based on one or more criteria, a mesh of a plurality of meshes to a virtual environment comprising a space and one or more media content items positioned at one or more locations within the space, wherein the one or more media content items are assigned with interest values indicating different levels of interest between at least two meshes of the plurality of meshes based on the one or more criteria; and
 causing, based on one or more interest values associated with the mesh, display of an output for guiding a user through the one or more locations within the virtual environment.

2. The method of claim 1, further comprising generating, based on one or more criteria, the plurality of meshes, wherein each of the plurality of meshes comprises a plurality of interest values corresponding to coordinates of locations in the virtual environment, wherein generating the plurality of meshes comprises applying a smoothing function to interest values corresponding to coordinates located between coordinates corresponding peak interest values to create gradual transitions between the plurality of interest values in each of the plurality of meshes.

3. The method of claim 2, further comprising storing each of the plurality of meshes as a matrix in memory, wherein the matrix comprises a plurality of cells, each of the plurality of cells includes a pairing between one of the plurality of interest values and a corresponding coordinate of a location in the virtual environment.

4. The method of claim 1, further comprising selecting between a first mesh of the plurality of meshes having first interest values that increase a likelihood of interaction between the user and the one or more media content items and a second mesh of the plurality of meshes having second interest values that reduce the likelihood of interaction between the user and the one or more media content items.

5. The method of claim 1, wherein causing display of the output comprises providing for display an overlay on the space, the overlay comprising a path using the one or more interest values to guide the user through the one or more locations.

6. The method of claim 5, further comprising determining, based on one or more interest values associated with the mesh, the path from a current position of the user and viewing orientation of the user through the virtual environment to a location of the one or more media content items.

7. The method of claim 1, further comprising:
 detecting a triggering event in the virtual environment; and
 selecting, based on the detected triggering event, between a first mesh of the plurality of meshes and a second mesh of the plurality of meshes, wherein the output for guiding the user through the one or more locations within the virtual environment is different between the first mesh and the second mesh.

8. A device comprising:
 one or more processors; and
 memory storing instructions that, when executed by the one or more processors, cause the device to:
  apply, based on one or more criteria, a mesh of a plurality of meshes to a virtual environment comprising a space and one or more media content items positioned at one or more locations within the space, wherein the one or more media content items are assigned with interest values indicating different levels of interest between at least two meshes of the plurality of meshes based on the one or more criteria, and
  cause, based on one or more interest values associated with the mesh, display of an output for guiding a user through the one or more locations within the virtual environment.

9. The device of claim 8, wherein the instructions, when executed, further cause the device to:
 generate, based on one or more criteria, the plurality of meshes, wherein each of the plurality of meshes comprises a plurality of interest values corresponding to coordinates of locations in the virtual environment, wherein generating the plurality of meshes comprises applying a smoothing function to interest values corresponding to coordinates located between coordinates corresponding peak interest values to create gradual transitions between the plurality of interest values in each of the plurality of meshes.

10. The device of claim 9, wherein the instructions, when executed, further cause the device to:
store each of the plurality of meshes as a matrix in memory, wherein the matrix comprises a plurality of cells, each of the plurality of cells includes a pairing between one of the plurality of interest values and a corresponding coordinate of a location in the virtual environment.

11. The device of claim 8, wherein the instructions, when executed, further cause the device to:
select between a first mesh of the plurality of meshes having first interest values that increase a likelihood of interaction between the user and the one or more media content items and a second mesh of the plurality of meshes having second interest values that reduce the likelihood of interaction between the user and the one or more media content items.

12. The device of claim 8, wherein the instructions, when executed, further cause the device to:
provide for display an overlay on the space, the overlay comprising a path using the one or more interest values to guide the user through the one or more locations.

13. The device of claim 12, wherein the instructions, when executed, further cause the device to:
determine, based on one or more interest values associated with the mesh, the path from a current position of the user and viewing orientation of the user through the virtual environment to a location of the one or more media content items.

14. The device of claim 8, wherein the instructions, when executed, further cause the device to:
detect a triggering event in the virtual environment; and
select, based on the detected triggering event, between a first mesh of the plurality of meshes and a second mesh of the plurality of meshes, wherein the output for guiding the user through the one or more locations within the virtual environment is different between the first mesh and the second mesh.

15. A non-transitory computer-readable storage medium storing instructions that, when executed, cause:
applying, based on one or more criteria, a mesh of a plurality of meshes to a virtual environment comprising a space and one or more media content items positioned at one or more locations within the space, wherein the one or more media content items are assigned with interest values indicating different levels of interest between at least two meshes of the plurality of meshes based on the one or more criteria; and
causing, based on one or more interest values associated with the mesh, display of an output for guiding a user through the one or more locations within the virtual environment.

16. The non-transitory computer-readable storage medium of claim 15, wherein the instructions further cause generating, based on one or more criteria, the plurality of meshes, wherein each of the plurality of meshes comprises a plurality of interest values corresponding to coordinates of locations in the virtual environment, wherein generating the plurality of meshes comprises applying a smoothing function to interest values corresponding to coordinates located between coordinates corresponding peak interest values to create gradual transitions between the plurality of interest values in each of the plurality of meshes.

17. The non-transitory computer-readable storage medium of claim 15, wherein the instructions further cause selecting between a first mesh of the plurality of meshes having first interest values that increase a likelihood of interaction between the user and the one or more media content items and a second mesh of the plurality of meshes having second interest values that reduce the likelihood of interaction between the user and the one or more media content items.

18. The non-transitory computer-readable storage medium of claim 15, wherein the instructions cause causing display of the output further cause providing for display an overlay on the space, the overlay comprising a path using the one or more interest values to guide the user through the one or more locations.

19. The non-transitory computer-readable storage medium of claim 18, wherein the instructions further cause determining, based on one or more interest values associated with the mesh, the path from a current position of the user and viewing orientation of the user through the virtual environment to a location of the one or more media content items.

20. The non-transitory computer-readable storage medium of claim 15, wherein the instructions further cause:
detecting a triggering event in the virtual environment; and
selecting, based on the detected triggering event, between a first mesh of the plurality of meshes and a second mesh of the plurality of meshes, wherein the output for guiding the user through the one or more locations within the virtual environment is different between the first mesh and the second mesh.

21. A system comprising:
a storage device; and
a computing device coupled to the storage device and configured to:
apply, based on one or more criteria, a mesh of a plurality of meshes to a virtual environment comprising a space and one or more media content items positioned at one or more locations within the space, wherein the one or more media content items are assigned with interest values indicating different levels of interest between at least two meshes of the plurality of meshes based on the one or more criteria, and
cause, based on one or more interest values associated with the mesh, display of an output for guiding a user through the one or more locations within the virtual environment.

22. The system of claim 21, wherein the computing device is further configured to:
generate, based on one or more criteria, the plurality of meshes, wherein each of the plurality of meshes comprises a plurality of interest values corresponding to coordinates of locations in the virtual environment, wherein generating the plurality of meshes comprises applying a smoothing function to interest values corresponding to coordinates located between coordinates corresponding peak interest values to create gradual transitions between the plurality of interest values in each of the plurality of meshes.

23. The system of claim 22, wherein the computing device is further configured to:
store each of the plurality of meshes as a matrix in the storage device, wherein the matrix comprises a plurality of cells, each of the plurality of cells includes a pairing between one of the plurality of interest values and a corresponding coordinate of a location in the virtual environment.

24. The system of claim 21, wherein the computing device is further configured to:
select between a first mesh of the plurality of meshes having first interest values that increase a likelihood of interaction between the user and the one or more media content items and a second mesh of the plurality of meshes having second interest values that reduce the likelihood of interaction between the user and the one or more media content items.

25. The system of claim 21, wherein the computing device is further configured to:
provide for display an overlay on the space, the overlay comprising a path using the one or more interest values to guide the user through the one or more locations.

26. The system of claim 25, wherein the computing device is further configured to:
determine, based on one or more interest values associated with the mesh, the path from a current position of the user and viewing orientation of the user through the virtual environment to a location of the one or more media content items.

27. The system of claim 21, wherein the computing device is further configured to:
detect a triggering event in the virtual environment; and
select, based on the detected triggering event, between a first mesh of the plurality of meshes and a second mesh of the plurality of meshes, wherein the output for guiding the user through the one or more locations within the virtual environment is different between the first mesh and the second mesh.

\* \* \* \* \*